(12) United States Patent
Ohkawa

(10) Patent No.: US 10,400,991 B2
(45) Date of Patent: Sep. 3, 2019

(54) LIGHT-EMITTING DEVICE, DISPLAY APPARATUS, AND LIGHTING APPARATUS

(71) Applicant: SONY CORPORATION, Tokyo (JP)

(72) Inventor: Shingo Ohkawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/566,235

(22) PCT Filed: Jan. 30, 2017

(86) PCT No.: PCT/JP2017/003188
§ 371 (c)(1),
(2) Date: Oct. 13, 2017

(87) PCT Pub. No.: WO2017/150035
PCT Pub. Date: Sep. 8, 2017

(65) Prior Publication Data
US 2018/0372300 A1 Dec. 27, 2018

(30) Foreign Application Priority Data

Mar. 1, 2016 (JP) .................................. 2016-039129

(51) Int. Cl.
*F21V 7/05* (2006.01)
*F21S 2/00* (2016.01)
(Continued)

(52) U.S. Cl.
CPC .................. *F21V 7/05* (2013.01); *F21S 2/00* (2013.01); *F21V 7/00* (2013.01); *F21V 17/06* (2013.01);
(Continued)

(58) Field of Classification Search
None
See application file for complete search history.

(56) References Cited

U.S. PATENT DOCUMENTS

2013/0077332 A1* 3/2013 Hessling ............... B64D 47/06
362/470
2015/0109559 A1* 4/2015 Lee .................. G02F 1/133606
349/67

(Continued)

FOREIGN PATENT DOCUMENTS

CN 104776349 A 7/2015
EP 2919062 A1 9/2015
(Continued)

OTHER PUBLICATIONS

International Search Report and Written Opinion of PCT Application No. PCT/JP2017/003188, dated Apr. 25, 2017, 06 pages Of ISRWO.

*Primary Examiner* — Elmito Breval
(74) *Attorney, Agent, or Firm* — Chip Law Group

(57) ABSTRACT

There is provided a light-emitting device that makes is possible to emit light having less luminance unevenness. The light-emitting device includes: a light source substrate including a plurality of light sources; a first reflection member including a plurality of first apertures and a first overlap portion and located to overlap a portion of the light source substrate, each of the plurality of first apertures provided at a position corresponding to a relevant one of a plurality of first light sources, and the first overlap portion provided along an outer edge of the first reflection member; and a second reflection member including a plurality of second apertures and a second overlap portion and located to overlap another portion of the light source substrate, each of the plurality of second apertures provided at a position corresponding to a relevant one of a plurality of second light sources, and the second overlap portion provided along an outer edge of the second reflection member and overlapping the first overlap portion. The first reflection member and the second reflection member are provided at positions adjacent (Continued)

to each other in an in-plane direction, and are disposed to allow relative positions of the first reflection member and the second reflection member in the in-plane direction to be displaced within a range in which the first overlap portion and the second overlap portion overlap each other.

15 Claims, 35 Drawing Sheets

(51) Int. Cl.
*F21V 7/00* (2006.01)
*F21V 19/00* (2006.01)
*F21V 17/06* (2006.01)
*G02F 1/1335* (2006.01)
*F21Y 105/16* (2016.01)
*F21Y 115/10* (2016.01)

(52) U.S. Cl.
CPC ........ *F21V 19/00* (2013.01); *G02F 1/133605* (2013.01); *F21Y 2105/16* (2016.08); *F21Y 2115/10* (2016.08)

(56) References Cited

U.S. PATENT DOCUMENTS

| | | |
|---|---|---|
| 2015/0198304 A1 | 7/2015 | Ohkawa |
| 2017/0030531 A1* | 2/2017 | Kitagawa .............. F21V 3/0625 |
| 2018/0136521 A1* | 5/2018 | Nakaki ............. G02F 1/133603 |

FOREIGN PATENT DOCUMENTS

| | | |
|---|---|---|
| JP | 2009-140720 A | 6/2009 |
| JP | 2011-187172 A | 9/2011 |
| JP | 2013-246988 A | 12/2013 |
| JP | 2013-247039 A | 12/2013 |
| JP | 2015-156464 A | 8/2015 |

* cited by examiner

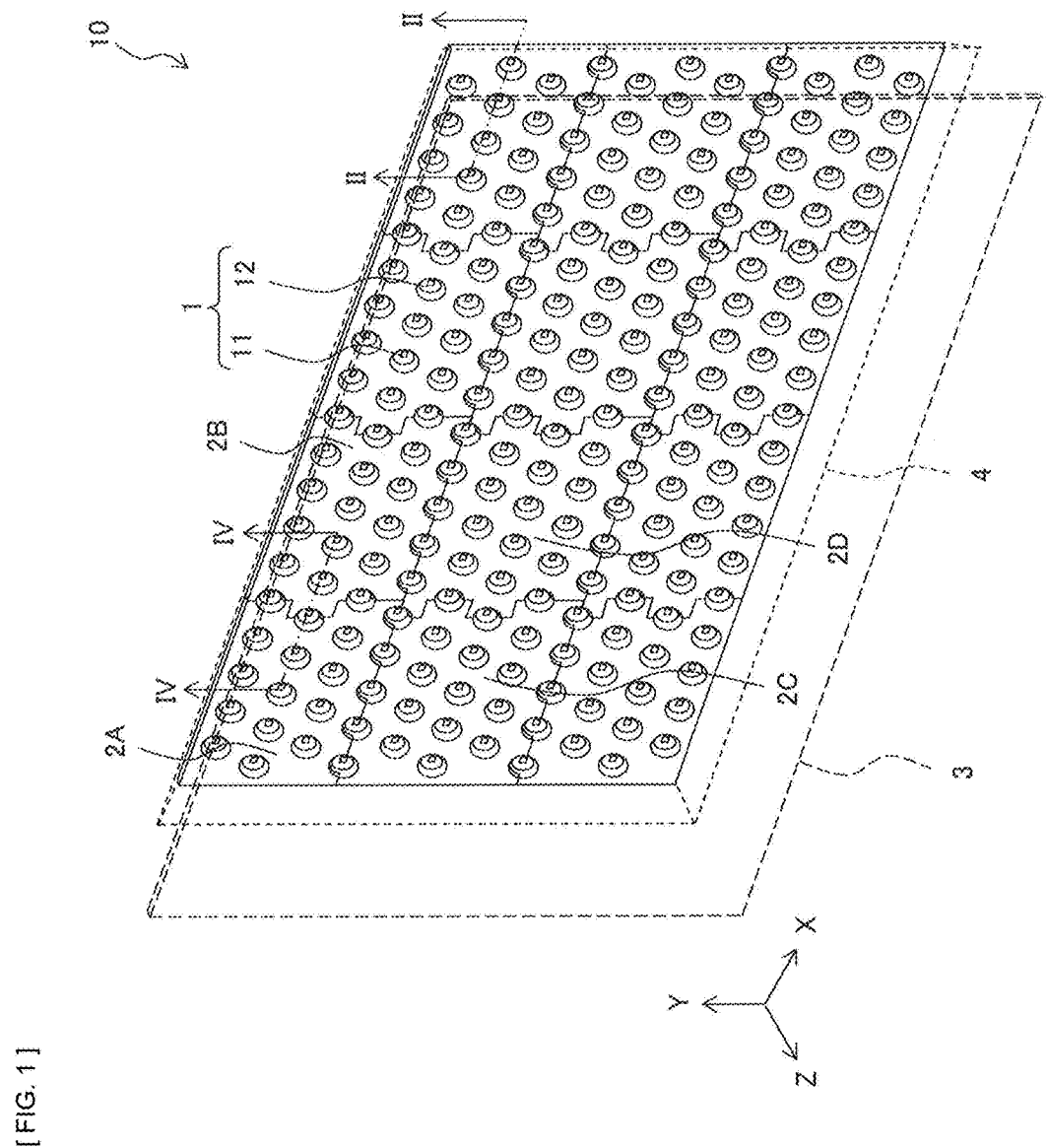
[FIG. 1]

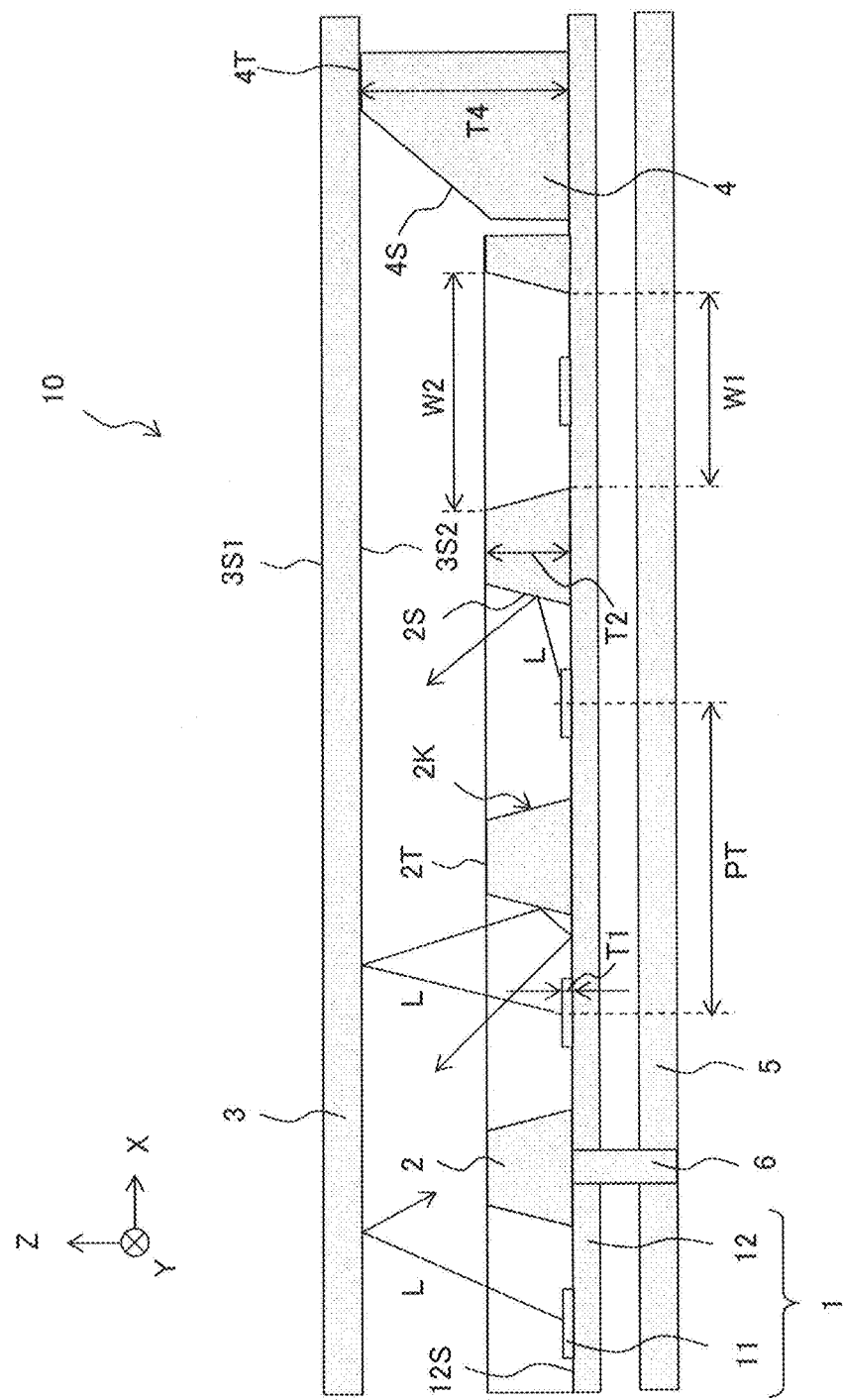
[FIG. 2]

[ FIG. 3A ]
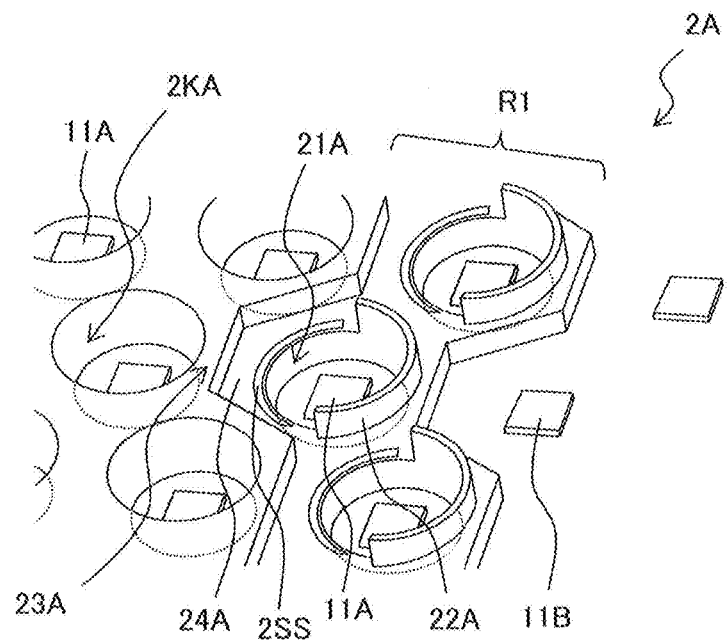
[ FIG. 3B ]
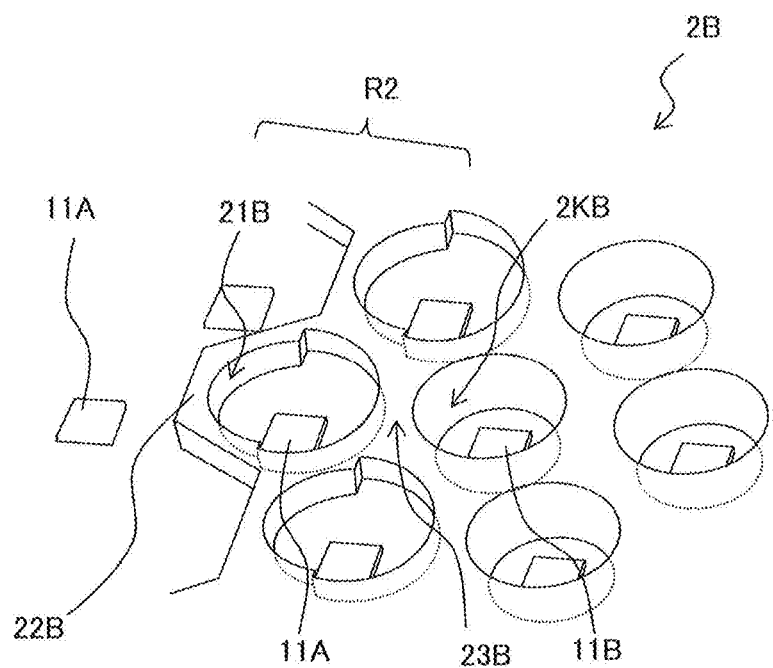

[ FIG. 3C ]
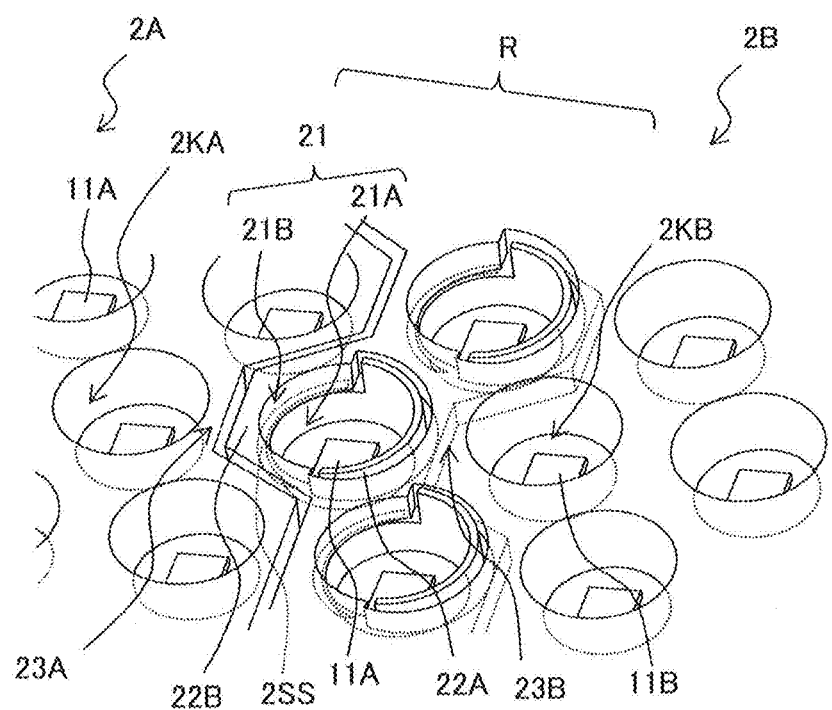

[ FIG. 4A ]
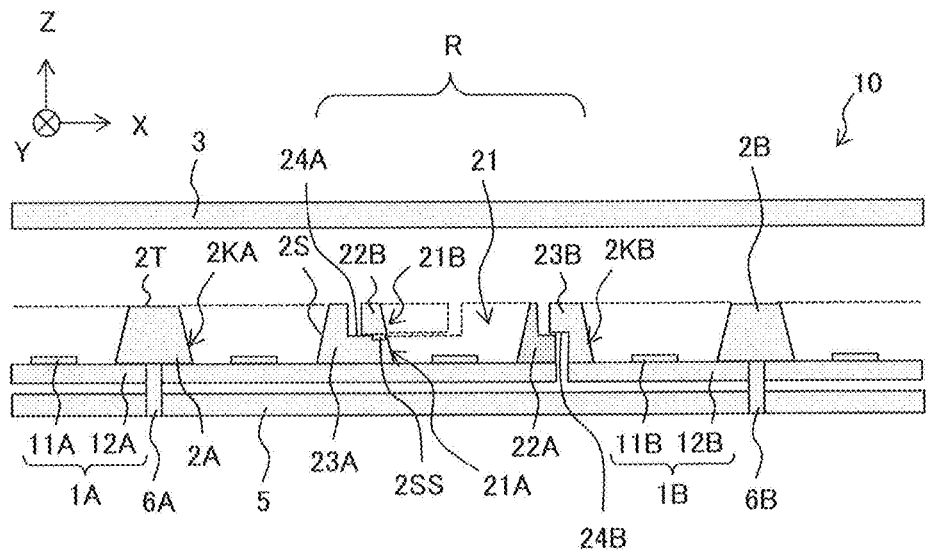
[ FIG. 4B ]
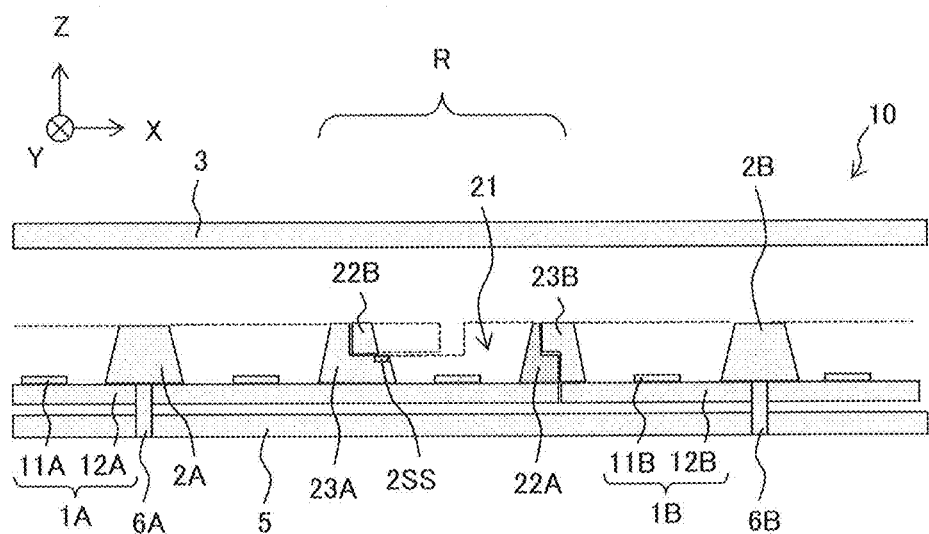

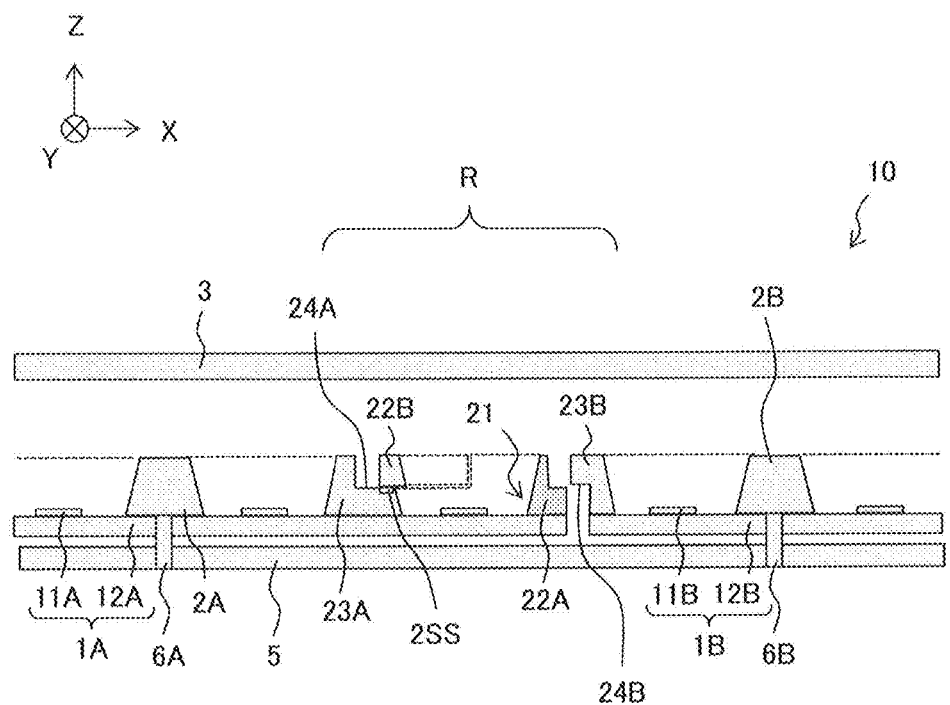

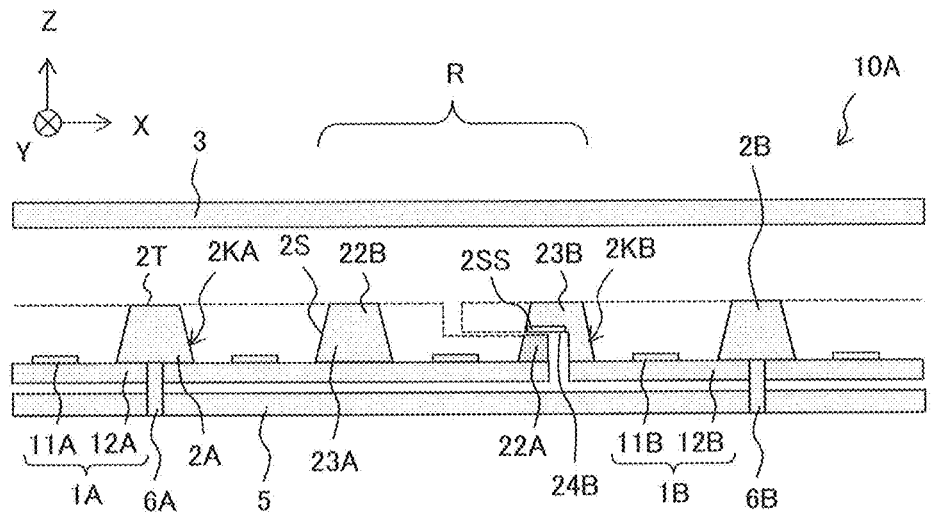
[ FIG. 5A ]
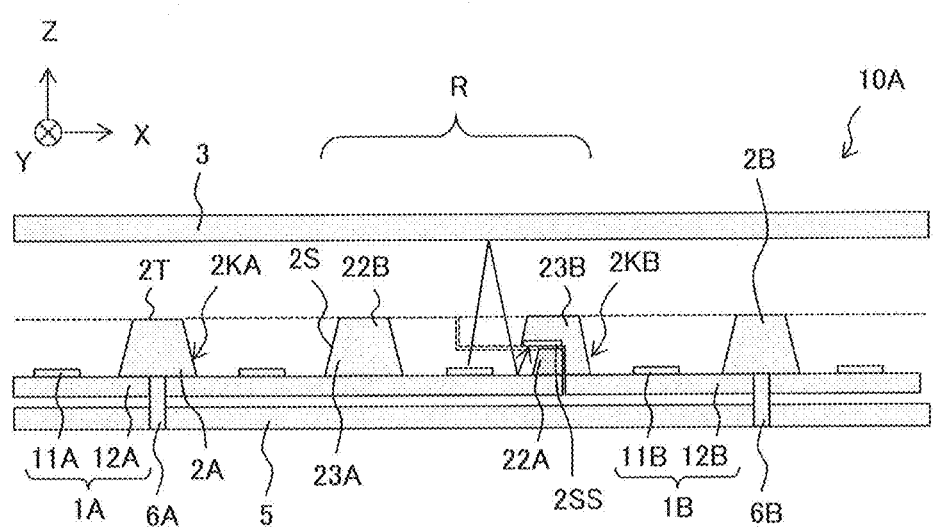
[ FIG. 5B ]

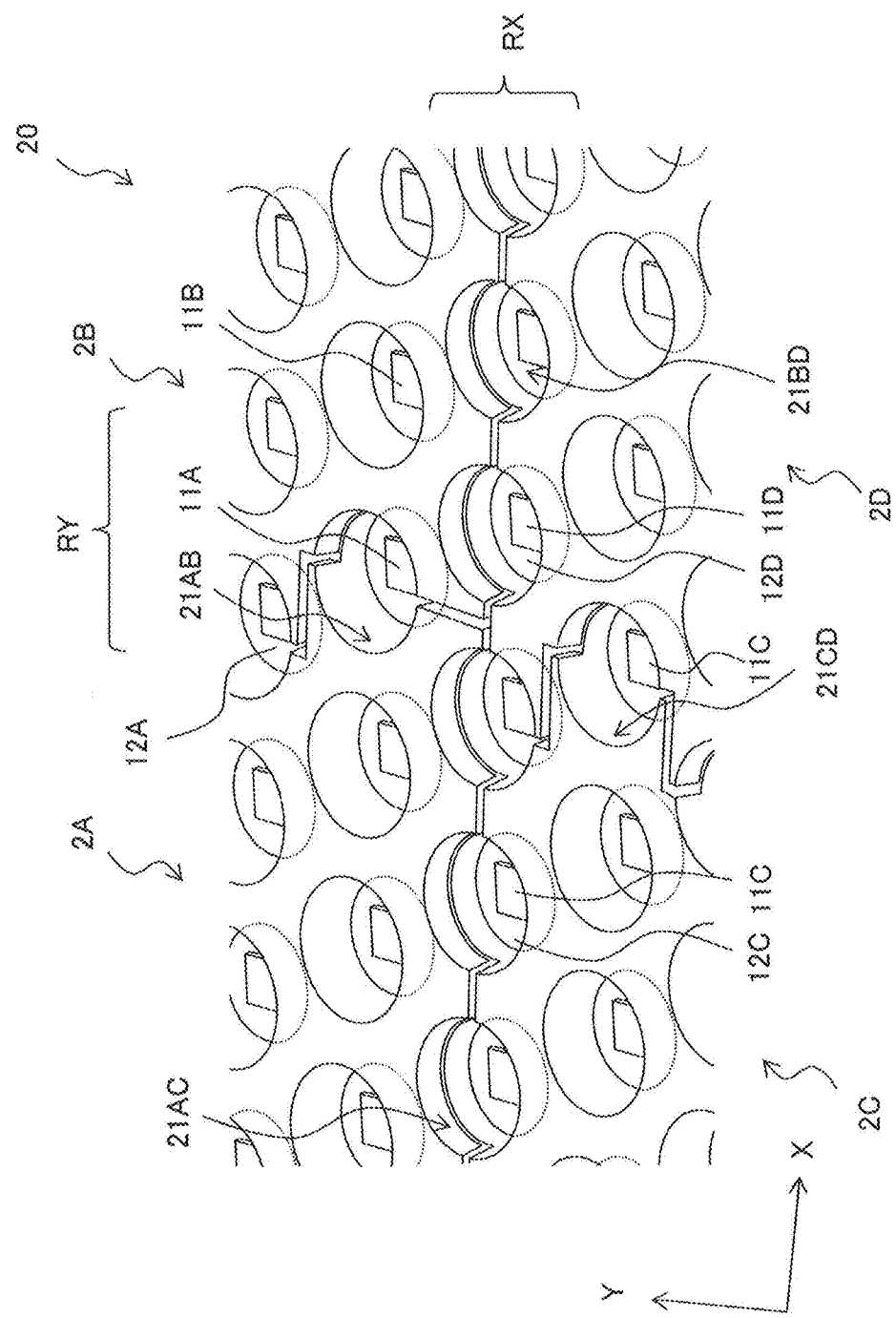
[FIG. 6]

[ FIG. 7A ]
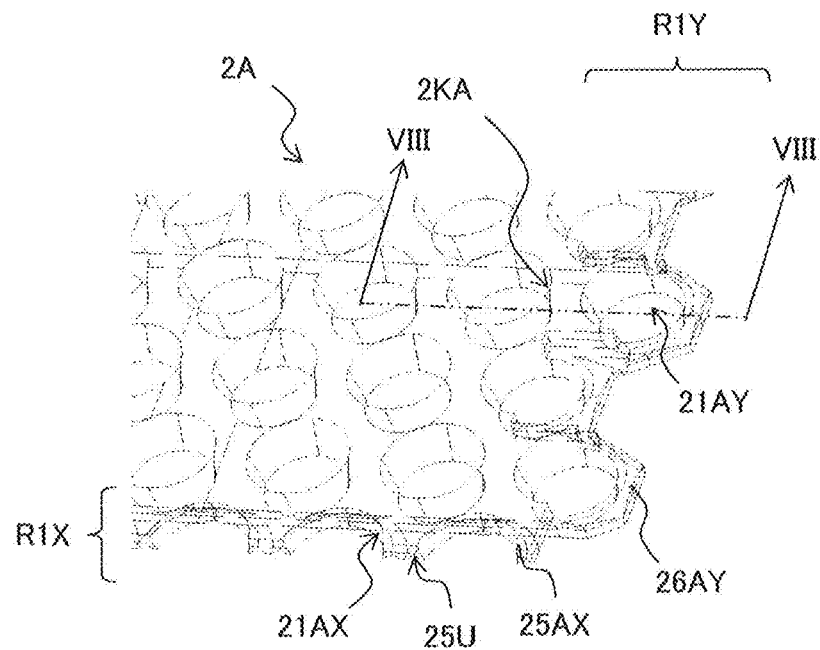
[ FIG. 7B ]
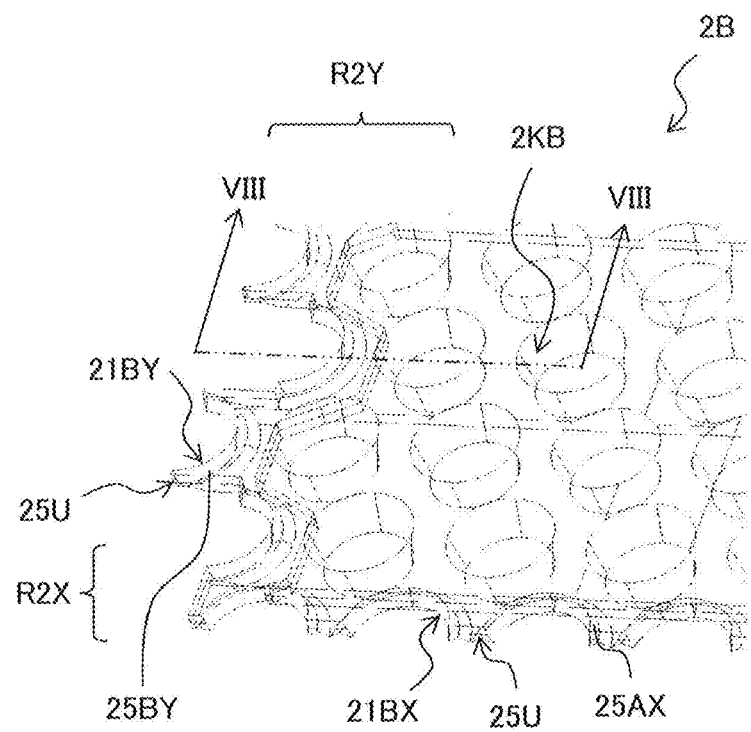

[ FIG. 7C ]
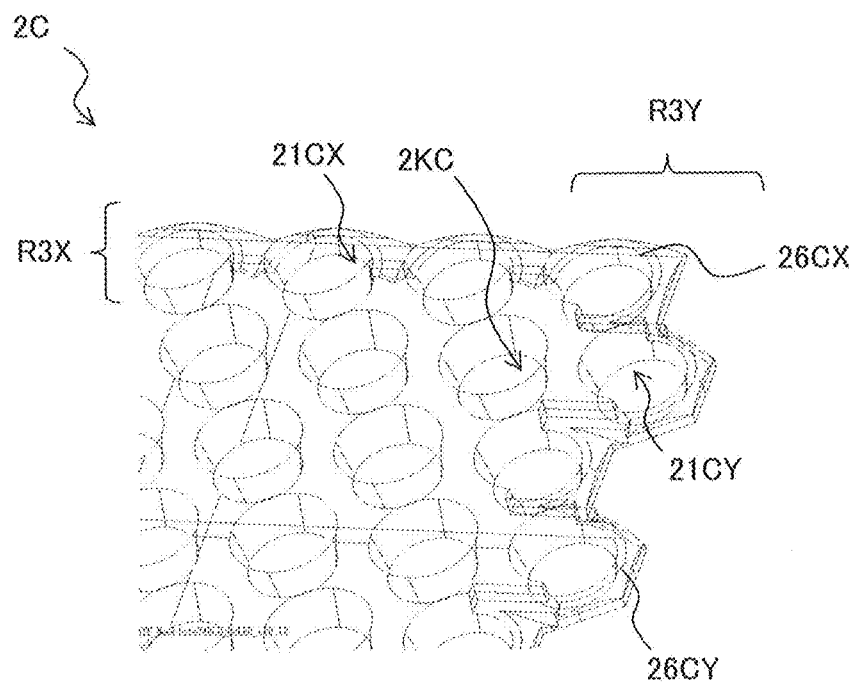
[ FIG. 7D ]
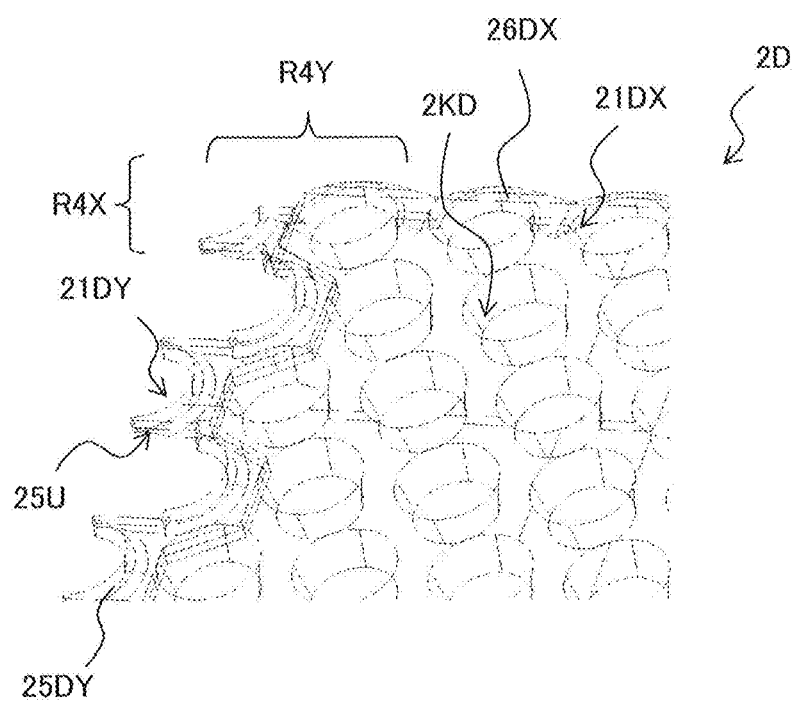

[ FIG. 8A ]
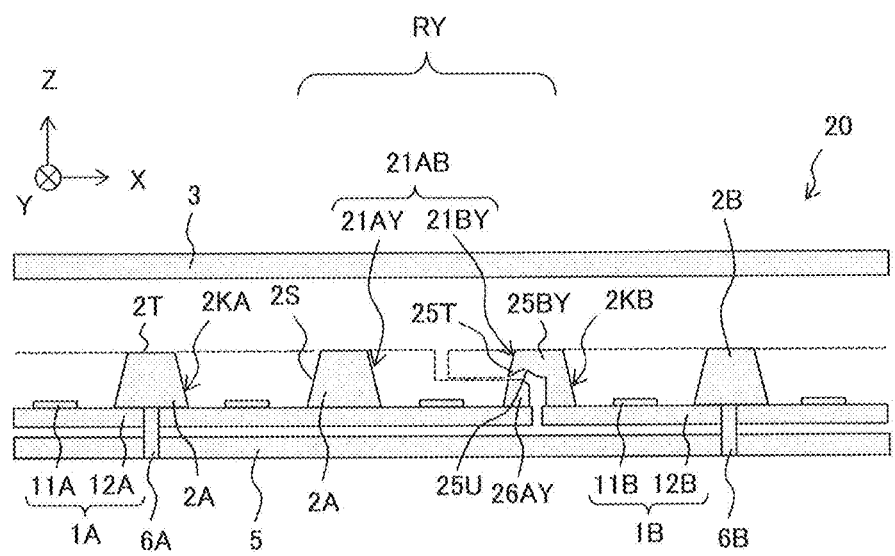
[ FIG. 8B ]
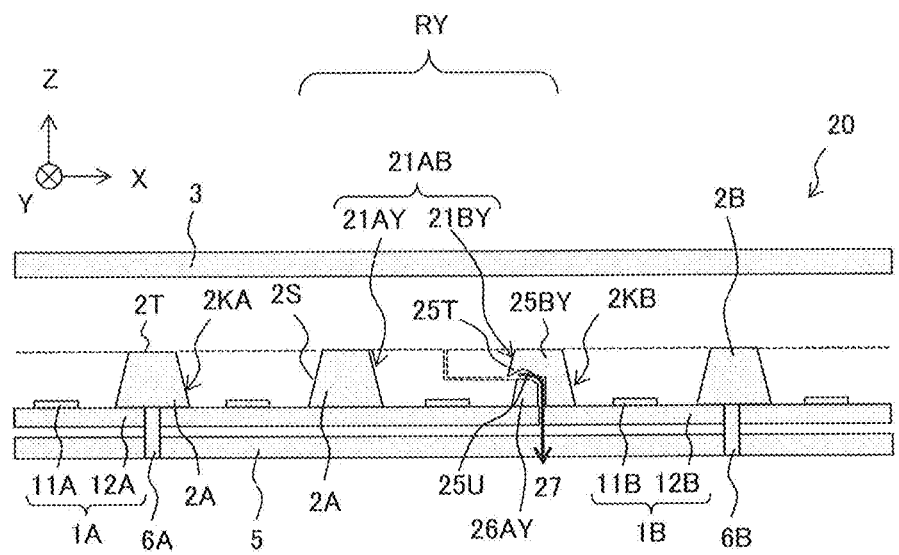

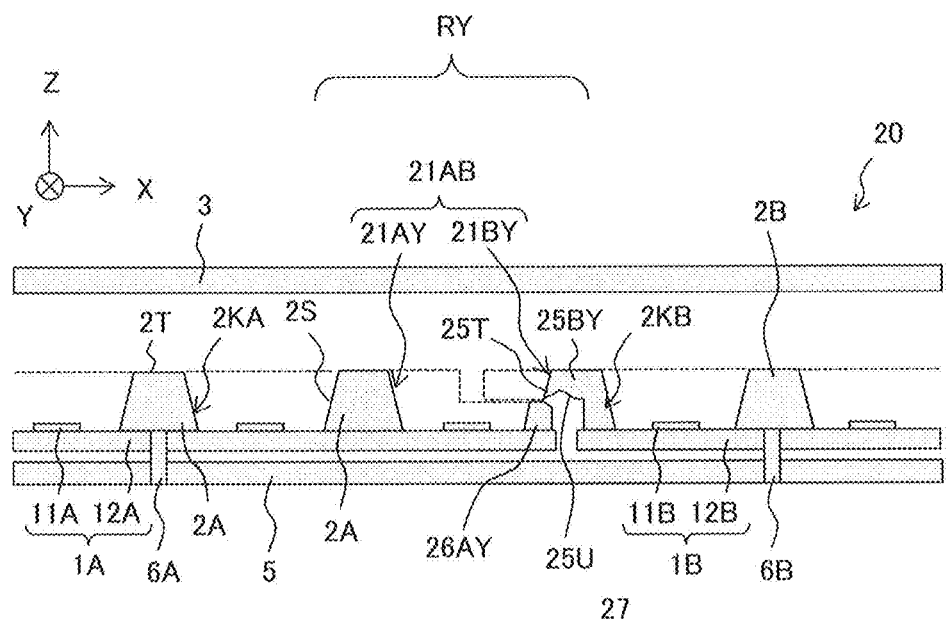
[ FIG. 8C ]

[ FIG. 9A ]
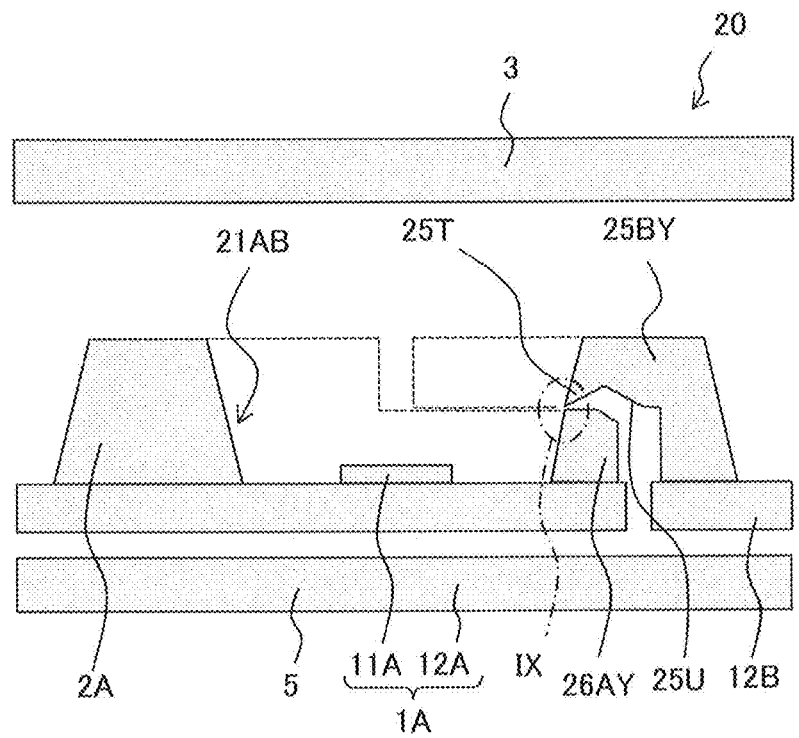
[ FIG. 9B ]
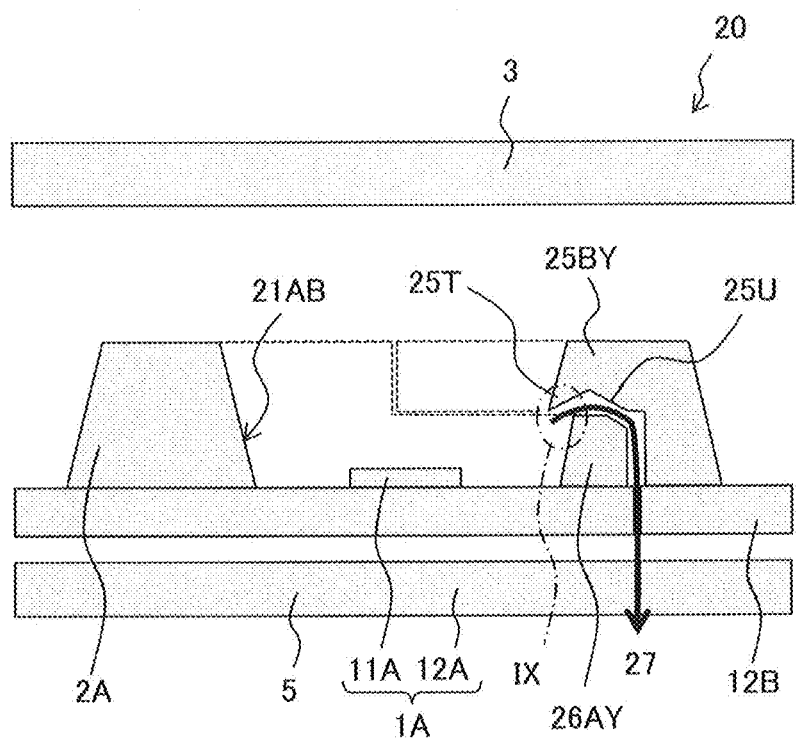

[FIG. 9C]
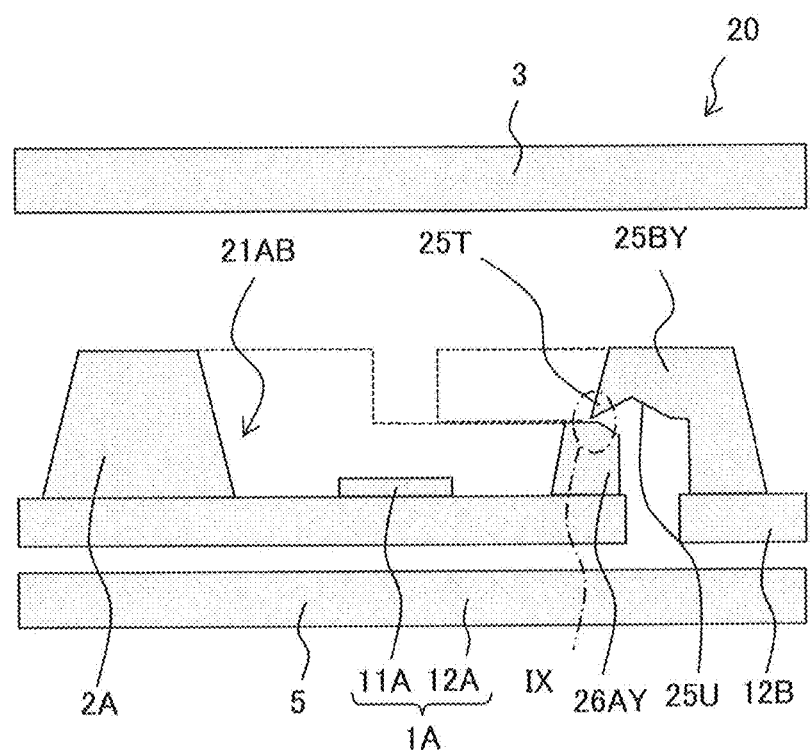

[ FIG. 10 ]
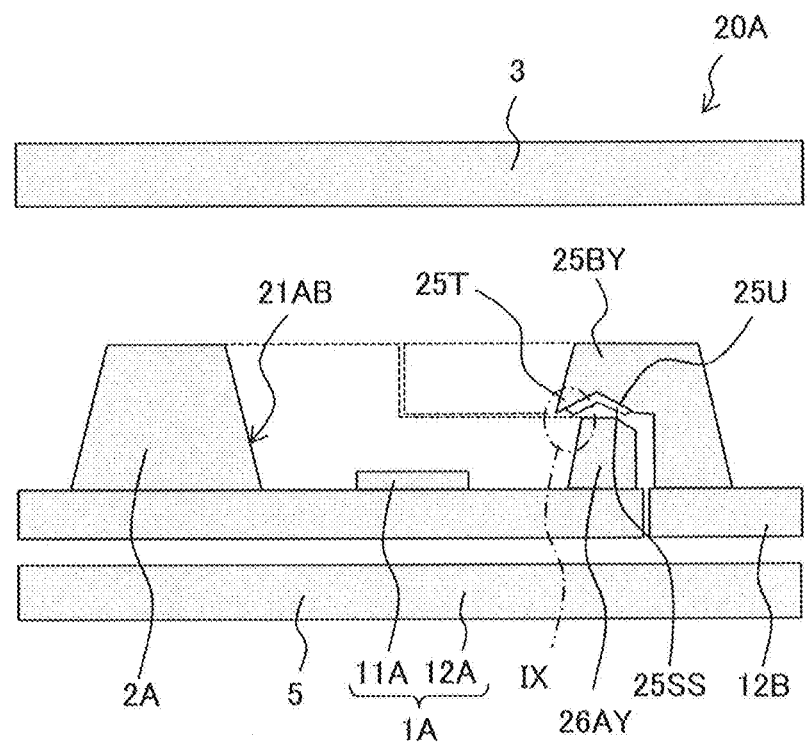

[ FIG. 11A ]
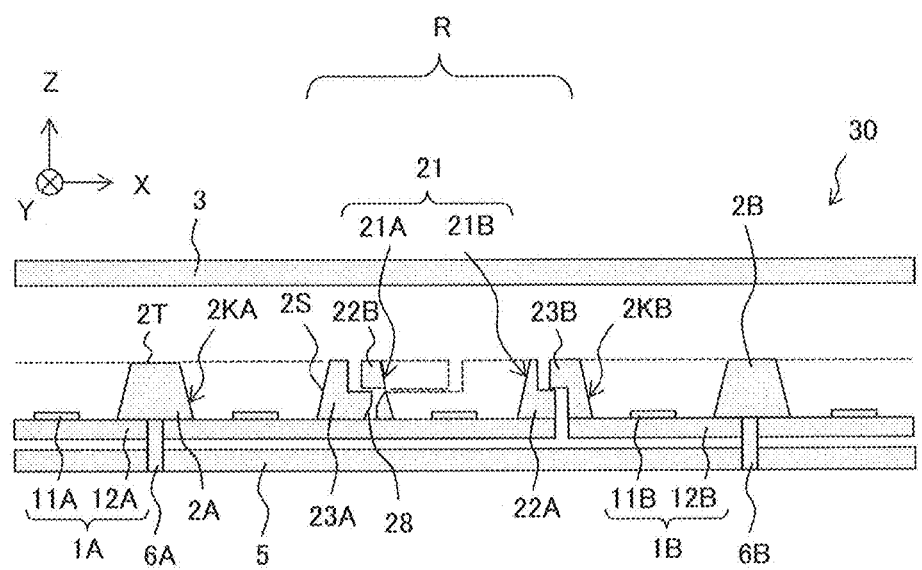
[ FIG. 11B ]
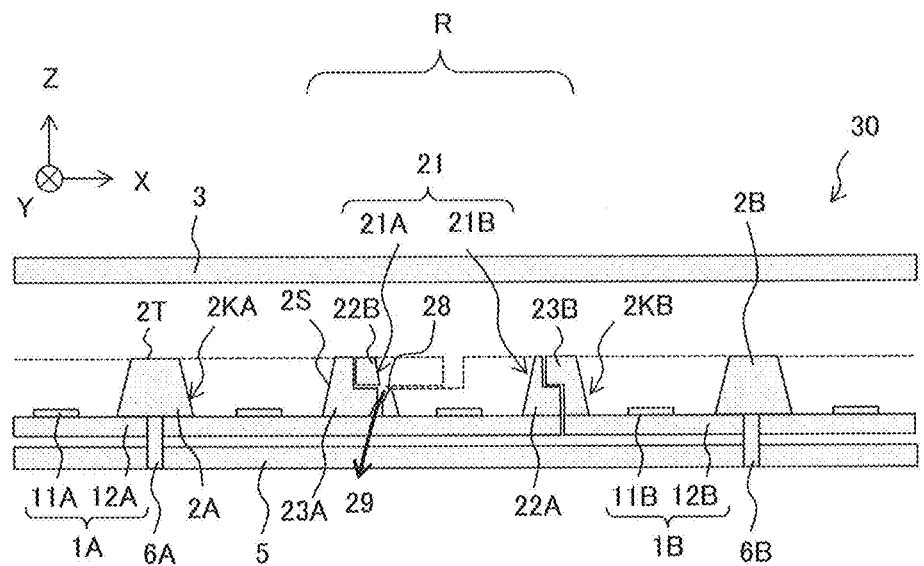

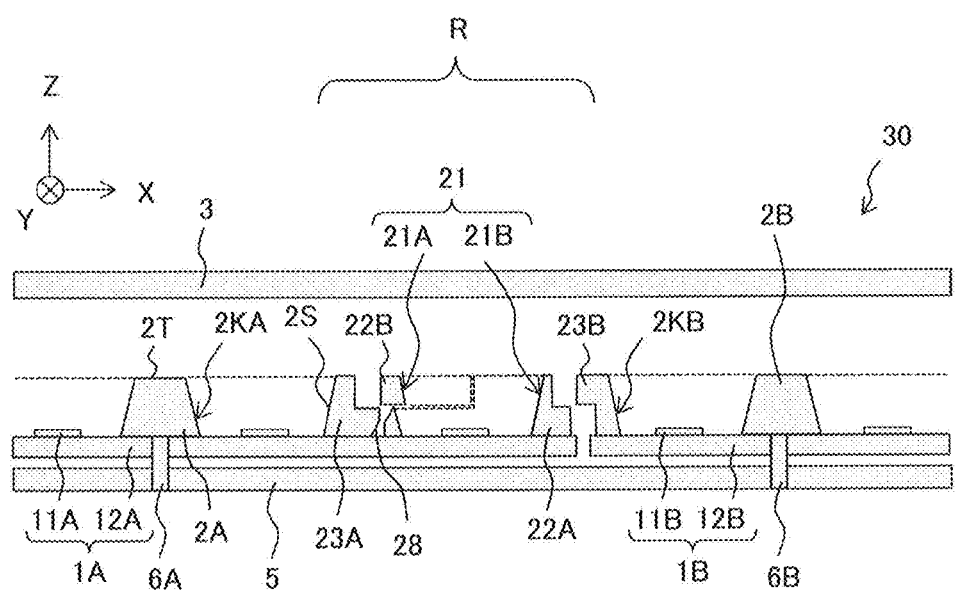
[FIG. 11C]

[ FIG. 12 ]
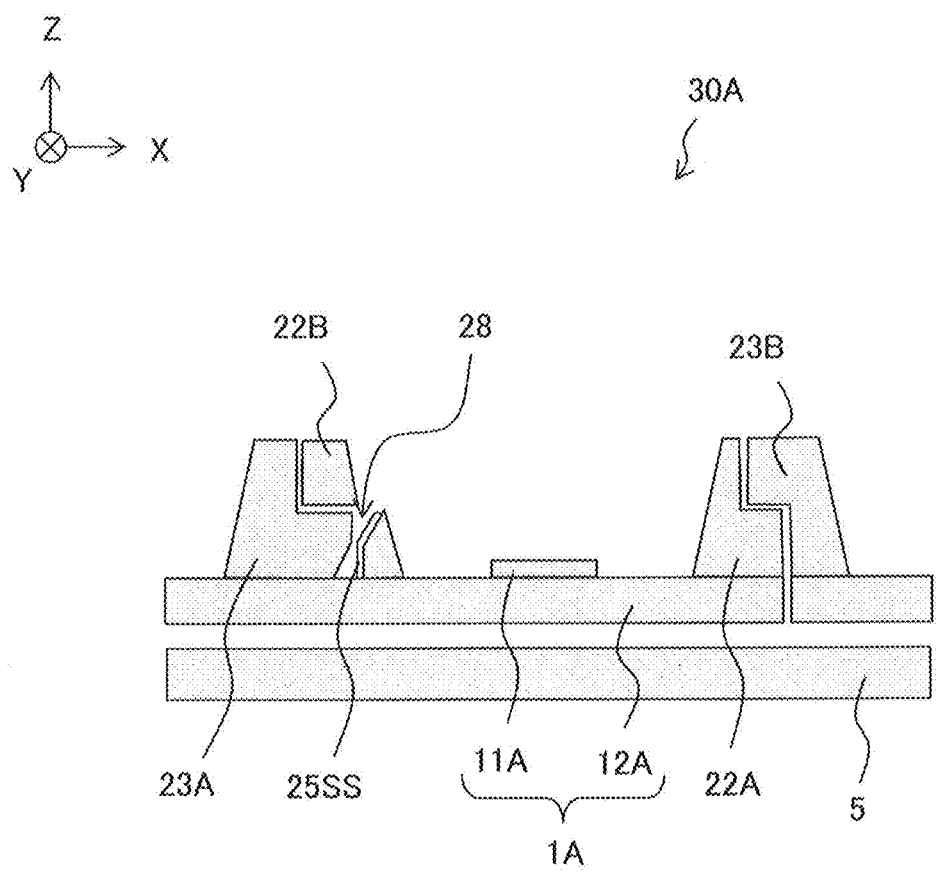

[ FIG. 13 ]
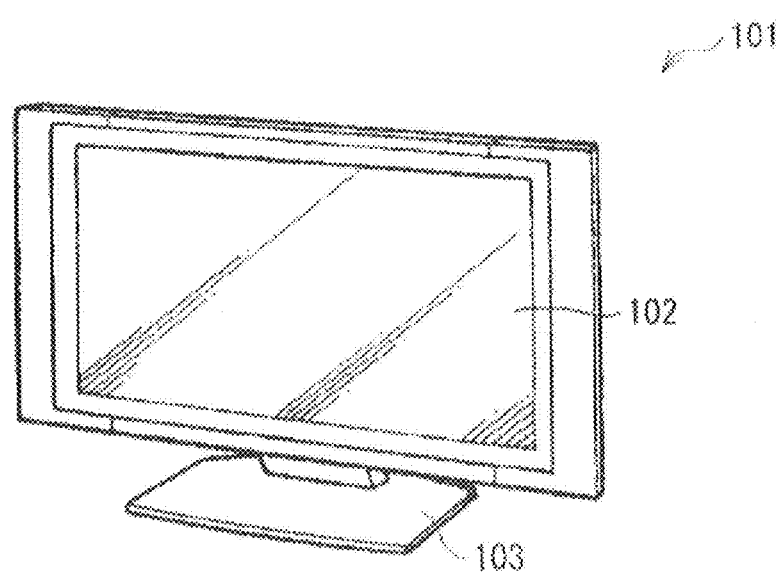

[ FIG. 14A ]
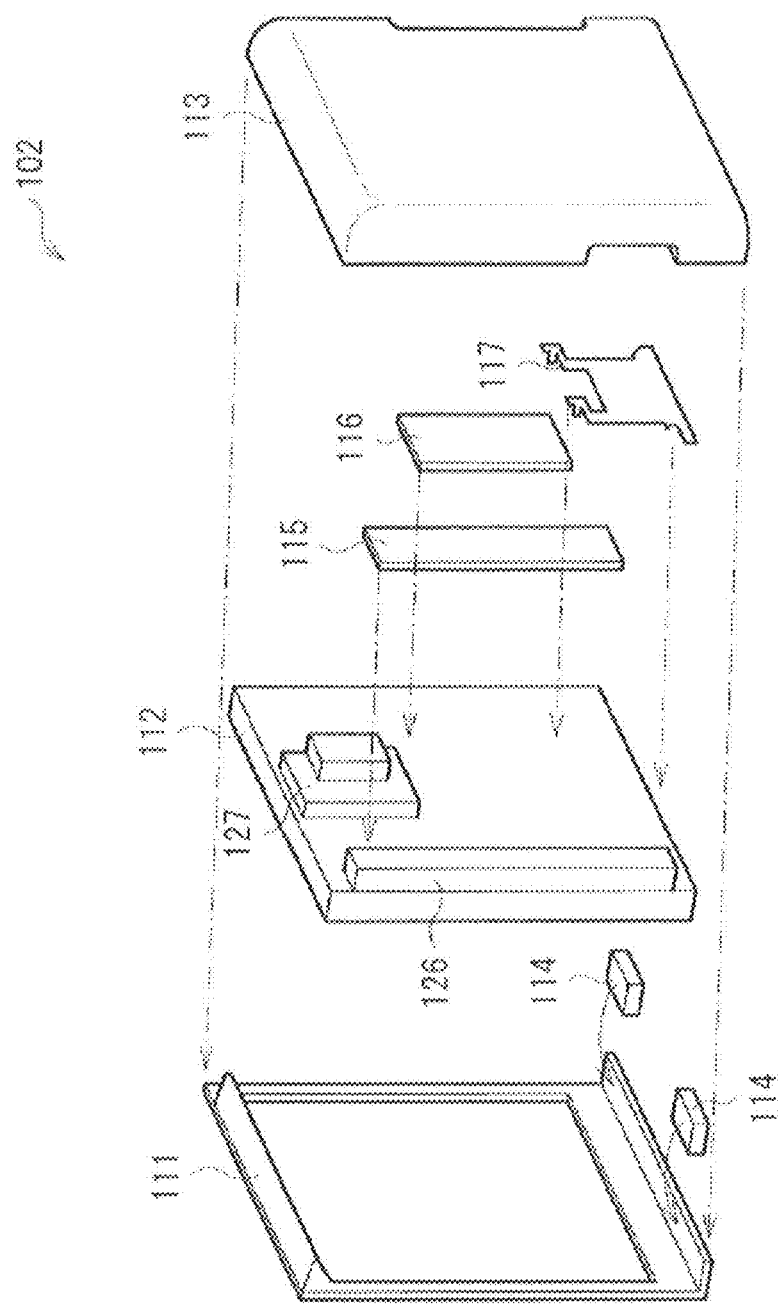

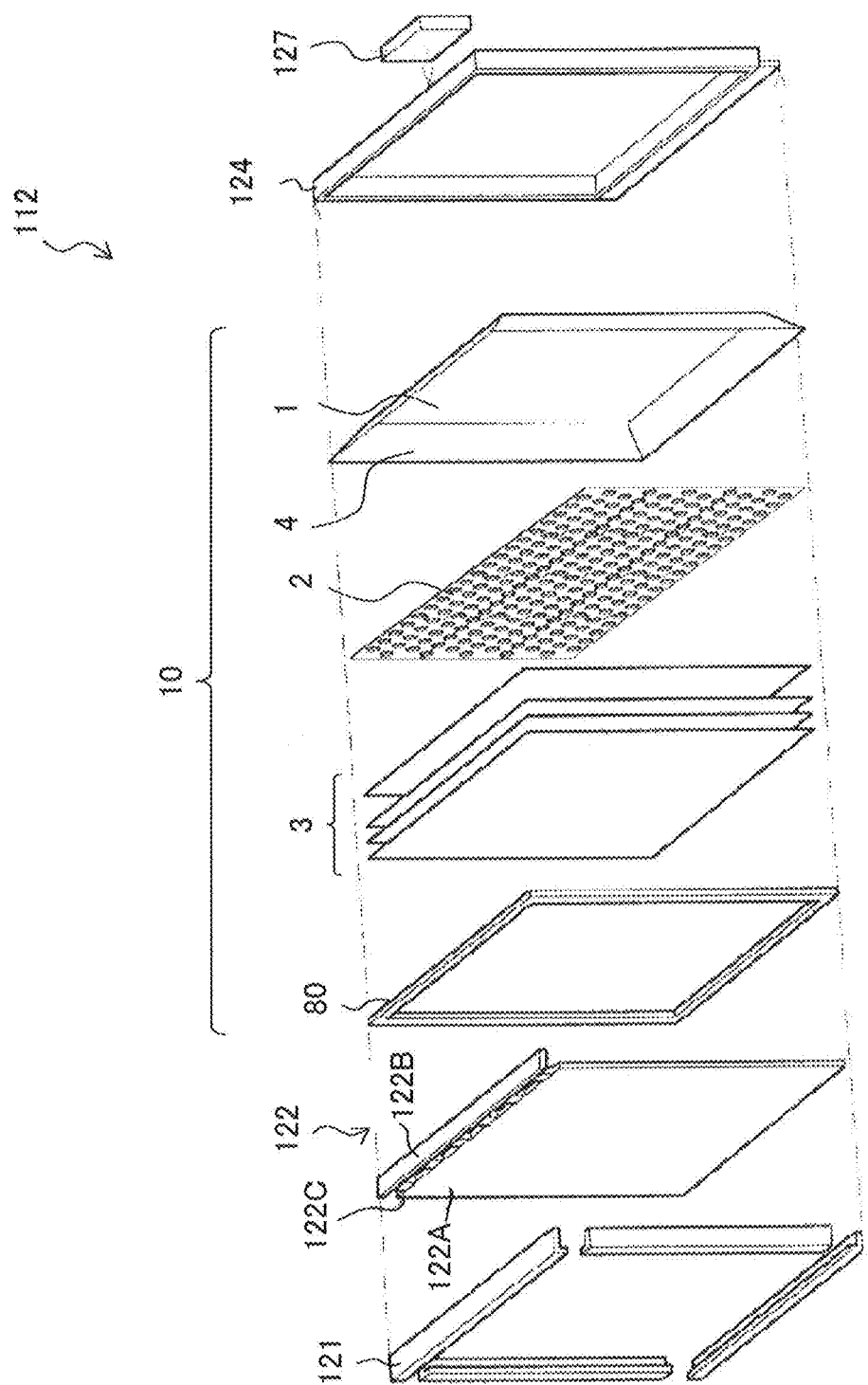
[ FIG. 14B ]

[ FIG. 15A ]
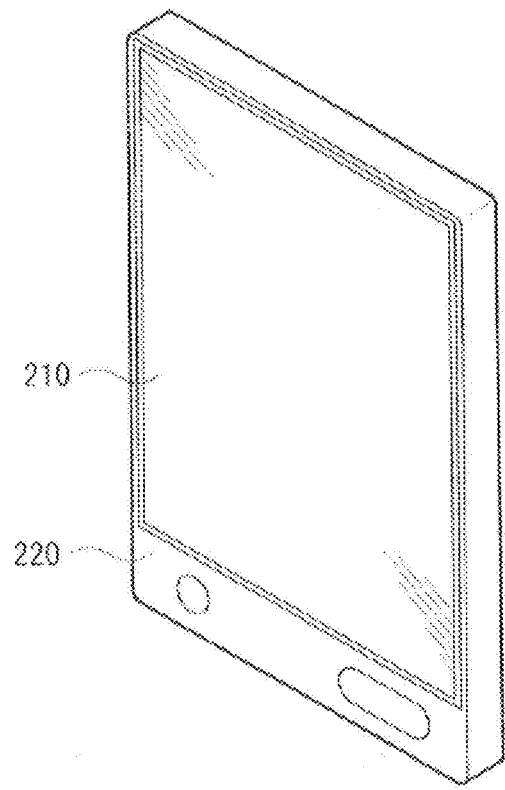
[ FIG. 15B ]
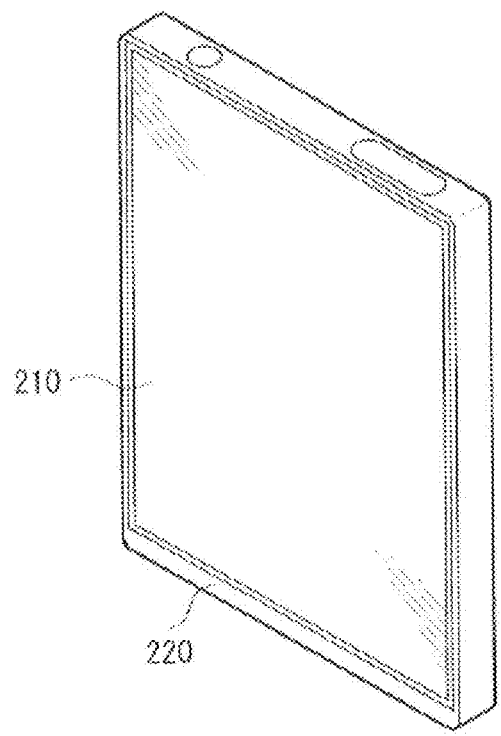

[ FIG. 16 ]
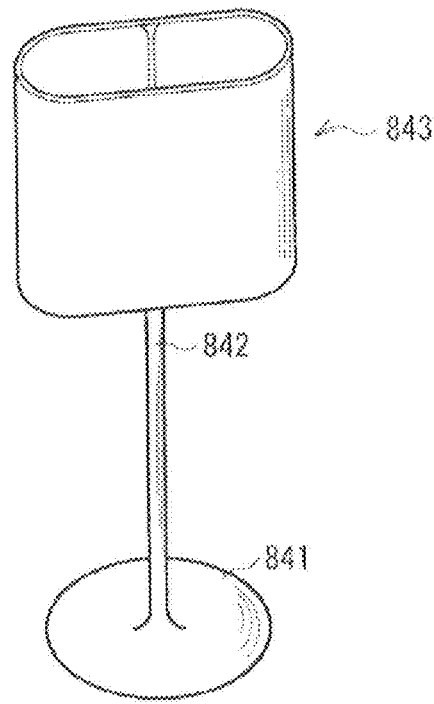
[ FIG. 17 ]
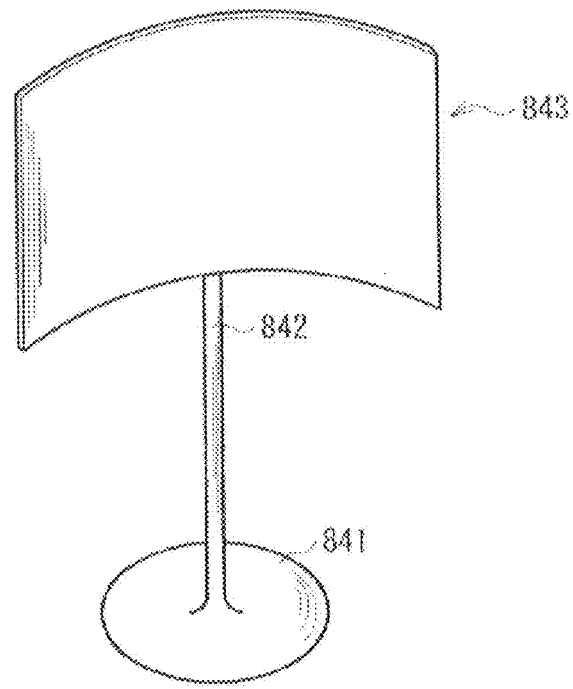

[ FIG. 18 ]
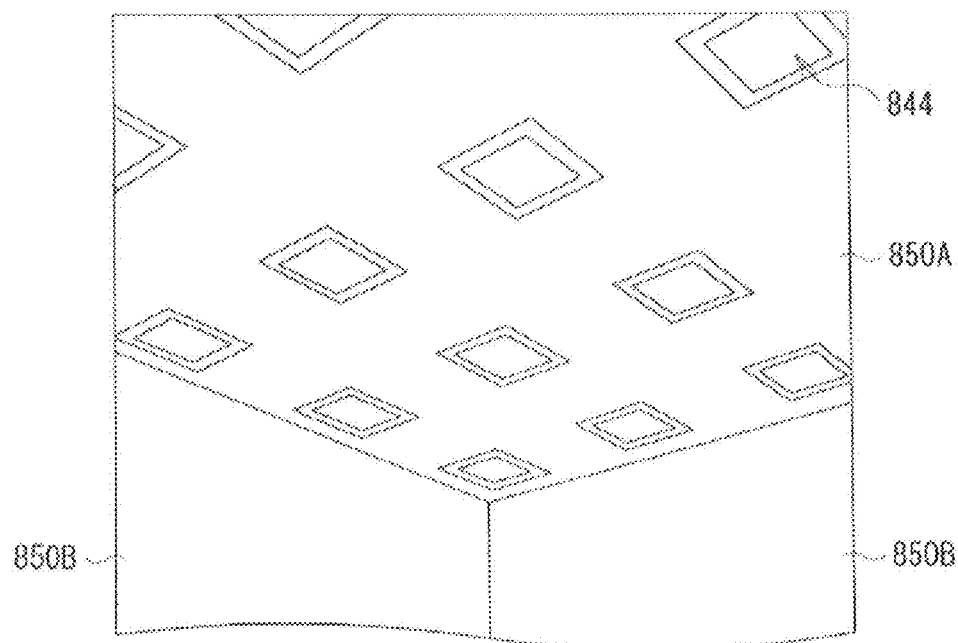

[ FIG. 19A ]
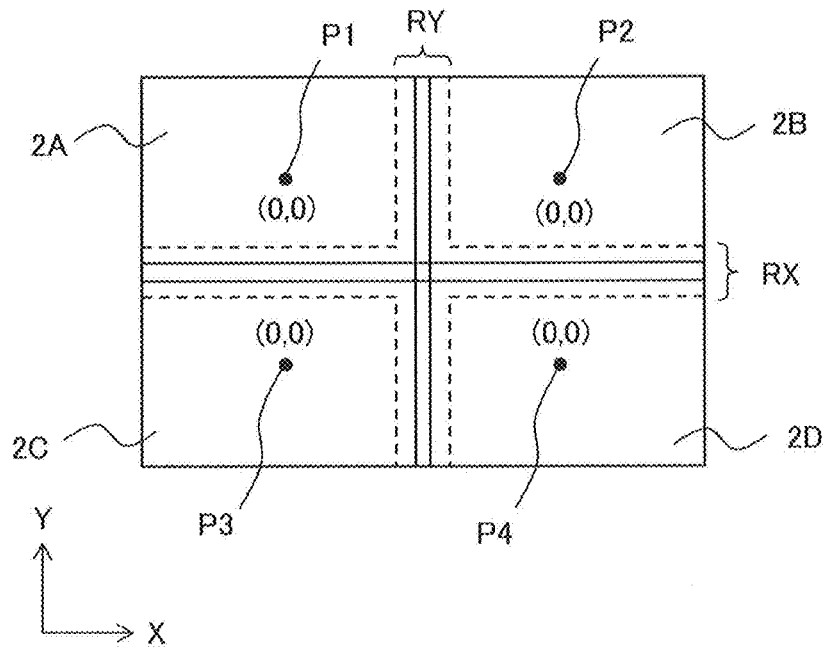
[ FIG. 19B ]
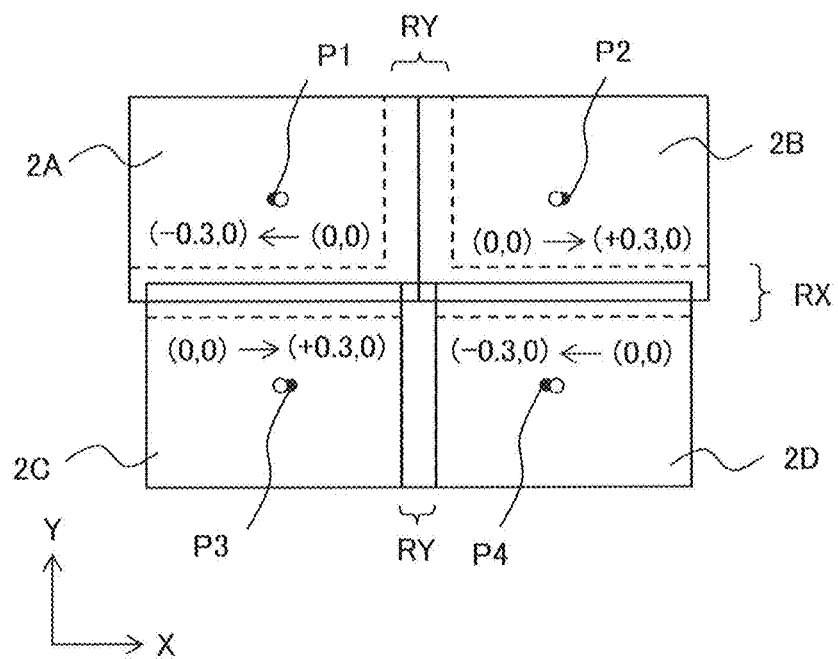

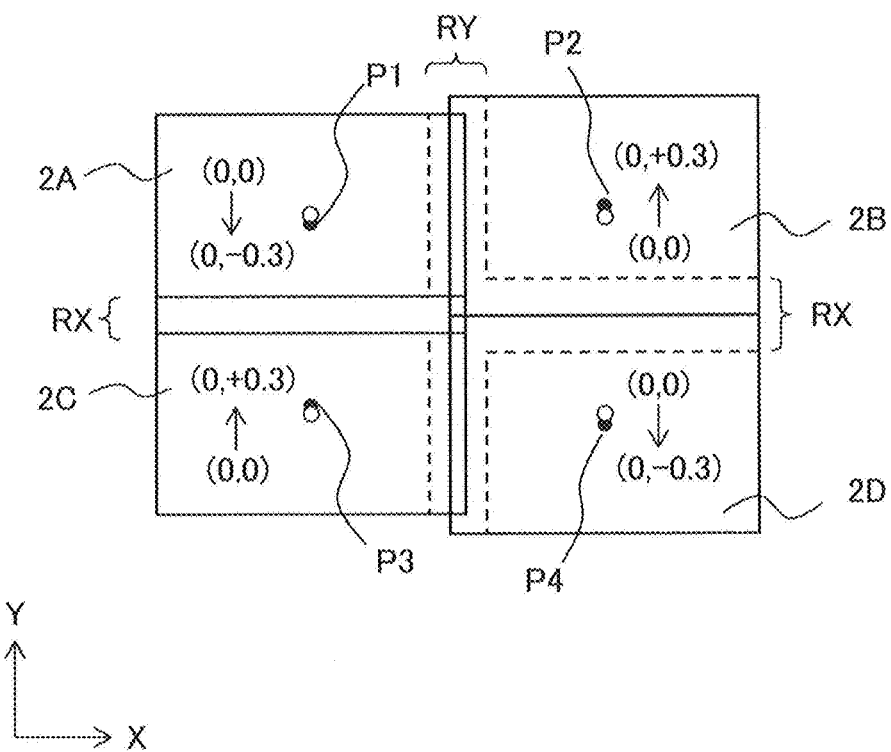
[FIG. 19C]

[ FIG. 20A ]
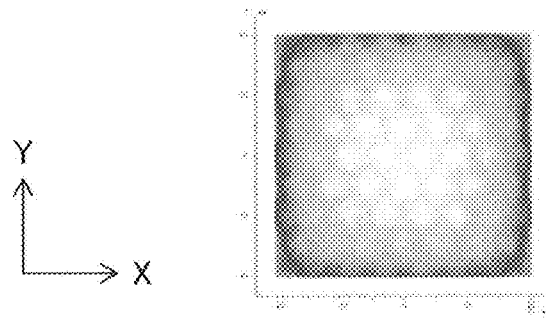
( EXPERIMENTAL EXAMPLE 1-1 )
[ FIG. 20B ]
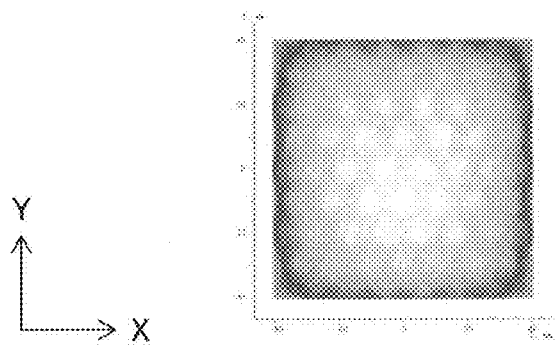
( EXPERIMENTAL EXAMPLE 1-2 )
[ FIG. 20C ]
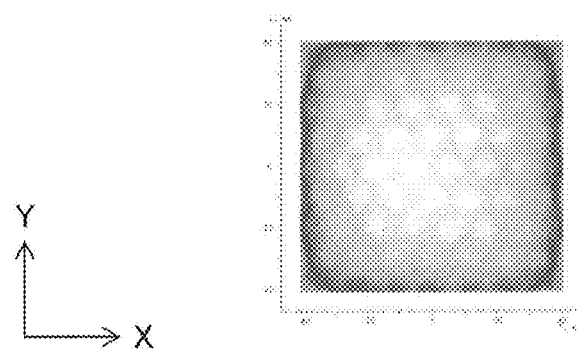
( EXPERIMENTAL EXAMPLE 1-3 )

[ FIG. 21A ]
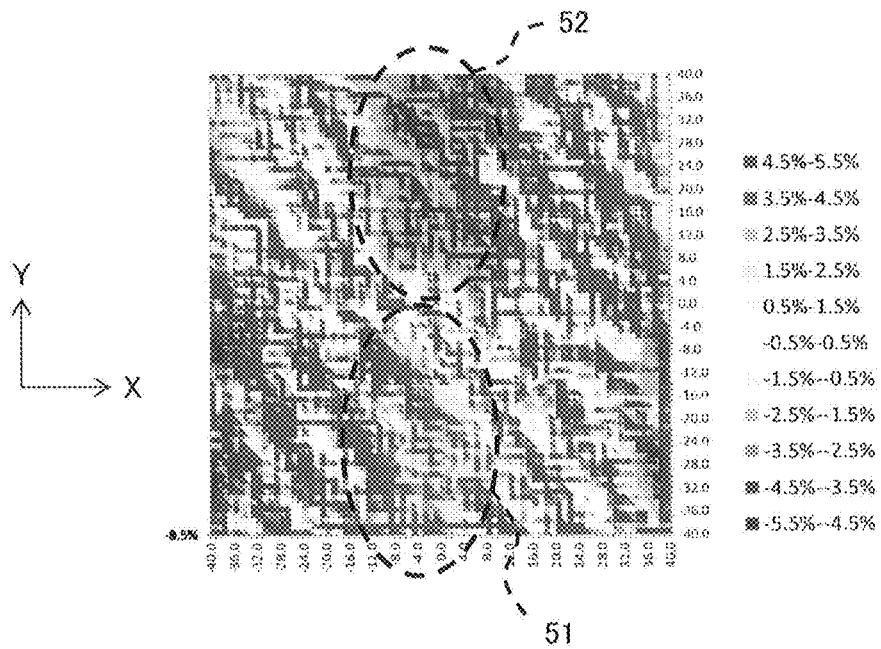
( DIFFERENCE BETWEEN EXPERIMENTAL EXAMPLE 1-1
AND EXPERIMENTAL EXAMPLE 1-2 )
[ FIG. 21B ]
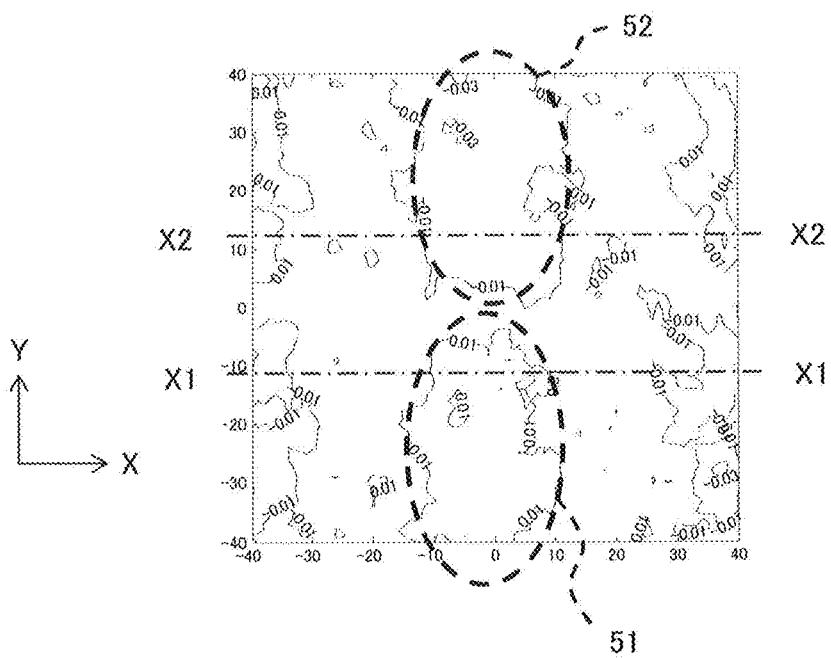
( DIFFERENCE BETWEEN EXPERIMENTAL EXAMPLE 1-1
AND EXPERIMENTAL EXAMPLE 1-2 )

[ FIG. 21C ]
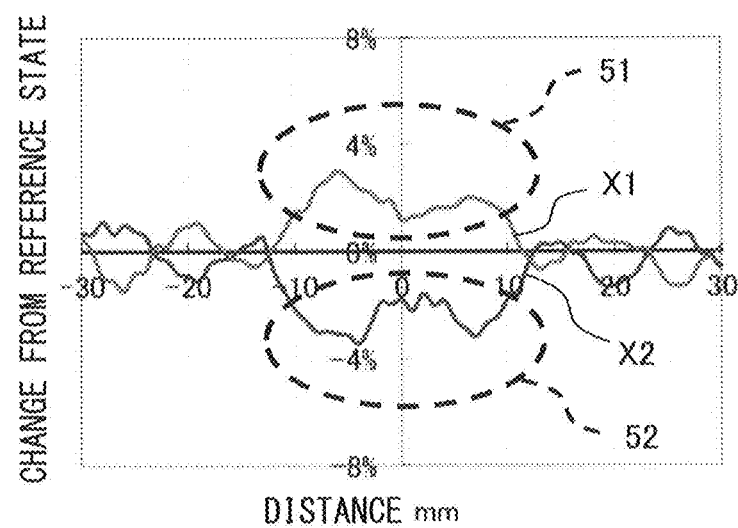
( DIFFERENCE BETWEEN EXPERIMENTAL EXAMPLE 1-1
AND EXPERIMENTAL EXAMPLE 1-2 )

[ FIG. 22A ]
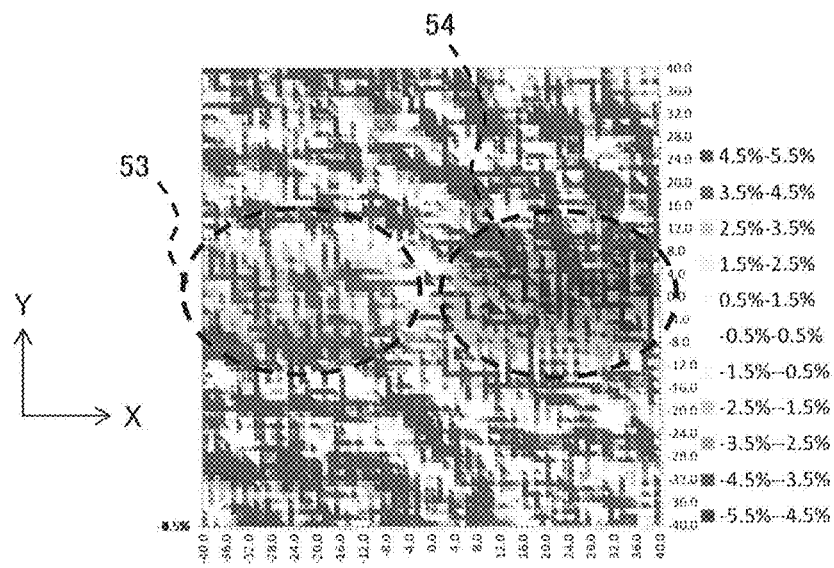
( DIFFERENCE BETWEEN EXPERIMENTAL EXAMPLE 1-1
AND EXPERIMENTAL EXAMPLE 1-3 )
[ FIG. 22B ]
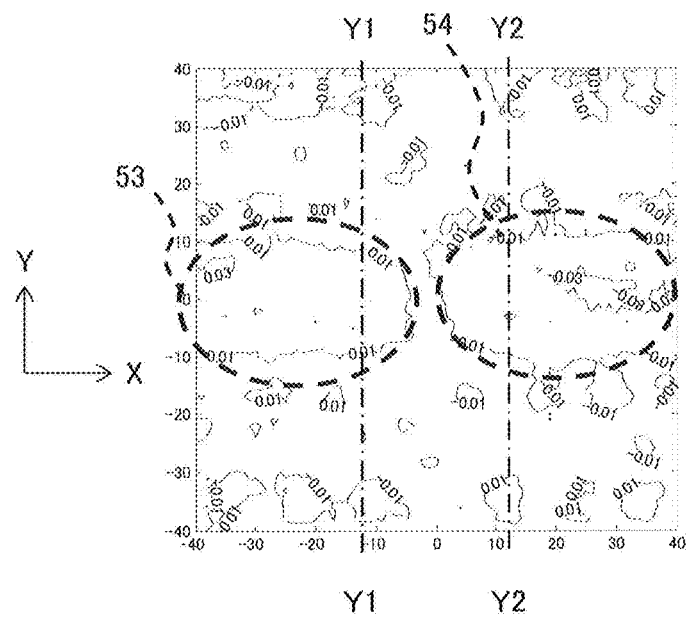
( DIFFERENCE BETWEEN EXPERIMENTAL EXAMPLE 1-1
AND EXPERIMENTAL EXAMPLE 1-3 )

[ FIG. 22C ]
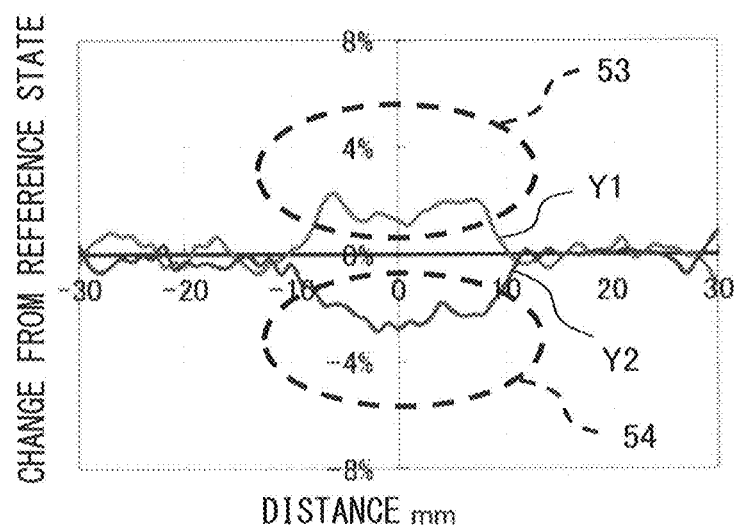
( DIFFERENCE BETWEEN EXPERIMENTAL EXAMPLE 1-1
AND EXPERIMENTAL EXAMPLE 1-3 )

[FIG. 23A]
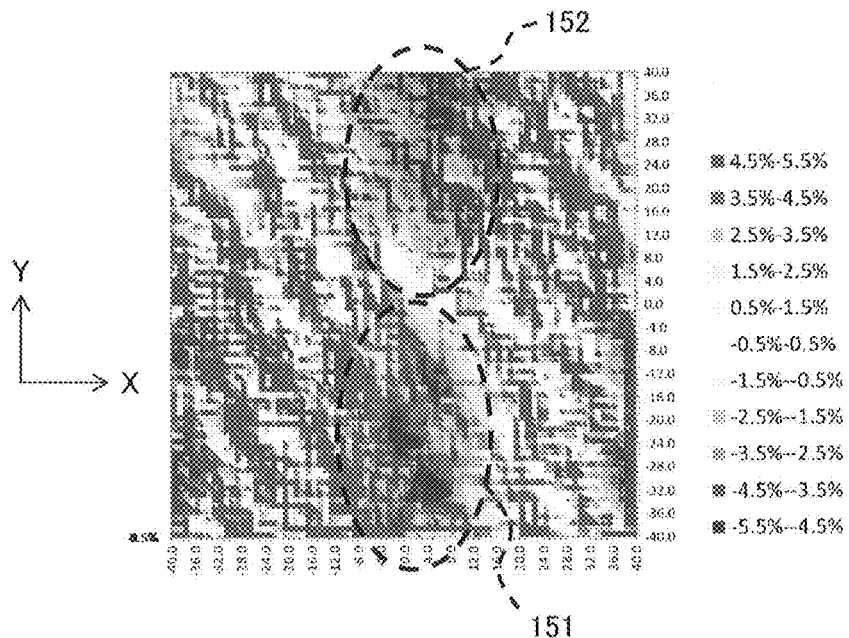
(DIFFERENCE BETWEEN REFERENCE EXAMPLE 1-1
AND REFERENCE EXAMPLE 1-2)
[FIG. 23B]
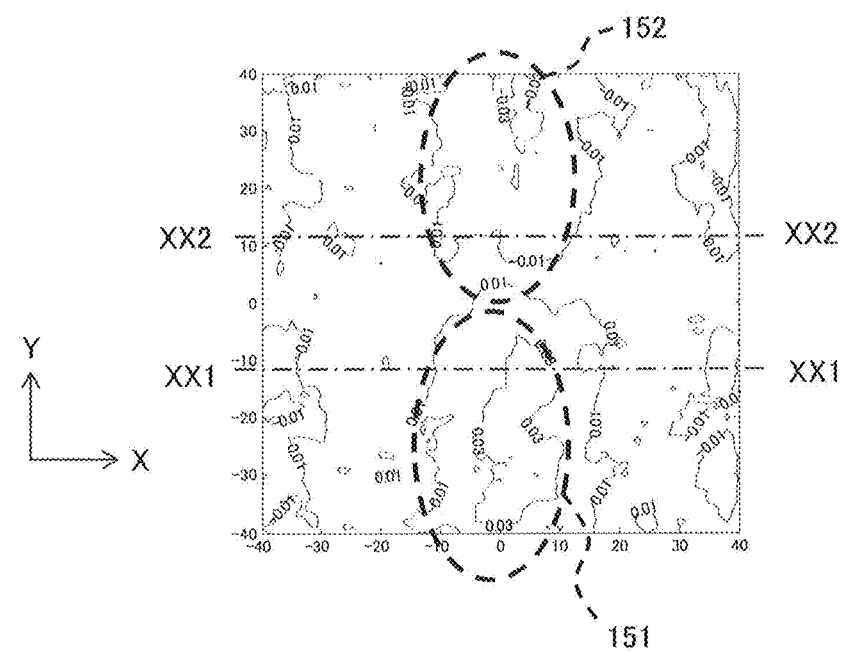
(DIFFERENCE BETWEEN REFERENCE EXAMPLE 1-1
AND REFERENCE EXAMPLE 1-2)

[ FIG. 23C ]
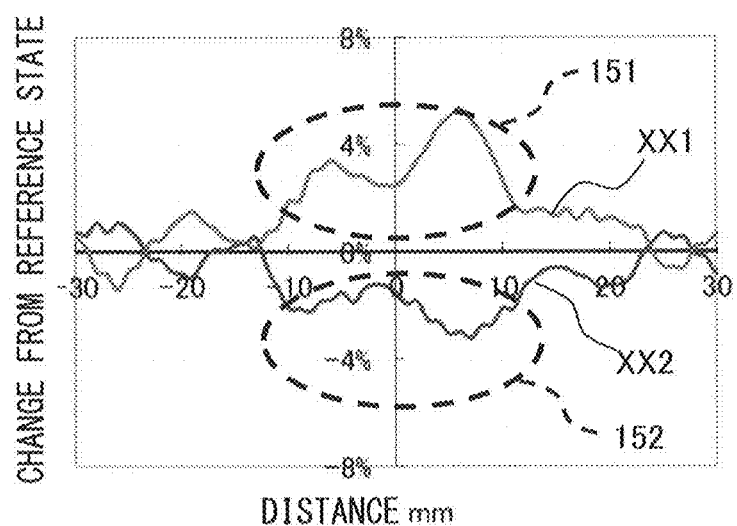
(DIFFERENCE BETWEEN REFERENCE EXAMPLE 1-1
AND REFERENCE EXAMPLE 1-2)

[FIG. 24A]
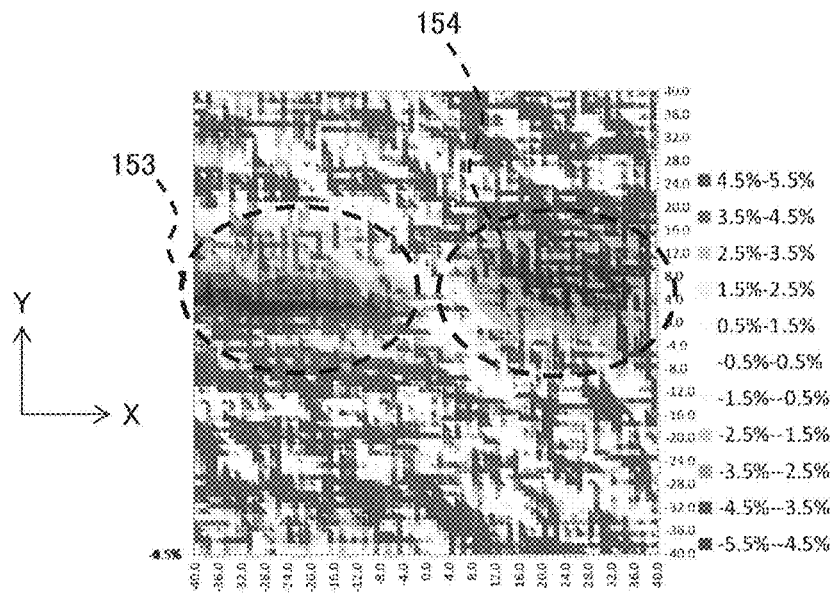
(DIFFERENCE BETWEEN REFERENCE EXAMPLE 1-1
AND REFERENCE EXAMPLE 1-3)
[FIG. 24B]
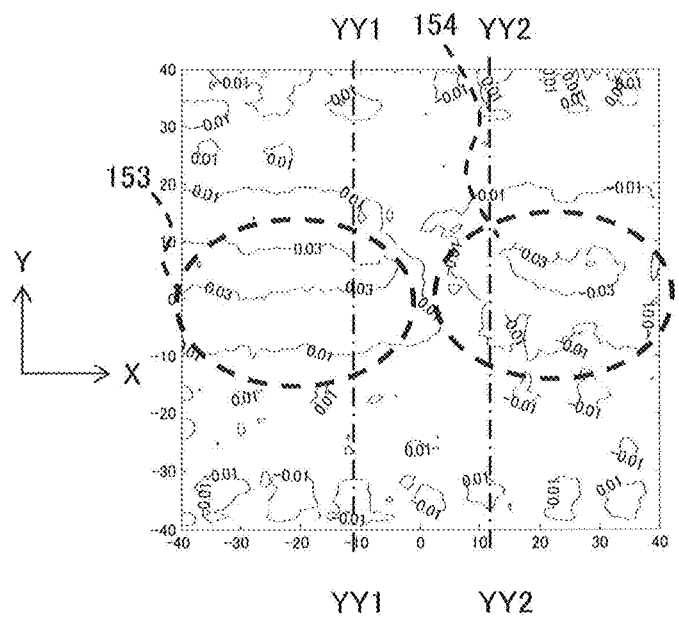
(DIFFERENCE BETWEEN REFERENCE EXAMPLE 1-1
AND REFERENCE EXAMPLE 1-3)

[ FIG. 24C ]
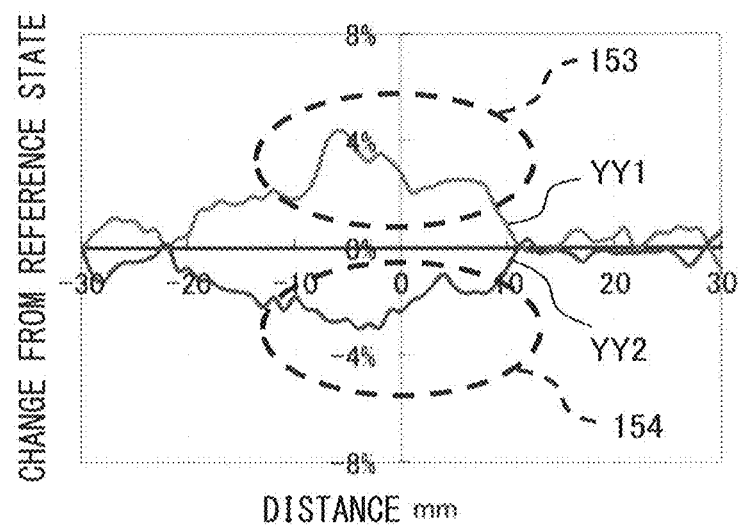
(DIFFERENCE BETWEEN REFERENCE EXAMPLE 1-1
AND REFERENCE EXAMPLE 1-3)

LIGHT-EMITTING DEVICE, DISPLAY APPARATUS, AND LIGHTING APPARATUS

CROSS REFERENCE TO RELATED APPLICATIONS

This application is a U.S. National Phase of International Patent Application No. PCT/JP2017/003188 filed on Jan. 30, 2017, which claims priority benefit of Japanese Patent Application No. JP 2016-039129 filed in the Japan Patent Office on Mar. 1, 2016. Each of the above-referenced applications is hereby incorporated herein by reference in its entirety.

TECHNICAL FIELD

The present disclosure relates to a light-emitting device applicable as a surface light source, and a display apparatus and a lighting apparatus each of which includes the same.

BACKGROUND ART

There has been proposed a light-emitting device in which light emitted from a light source such as a light emitting diode is reflected by a reflection plate having an aperture to flatten an in-plane luminance distribution (for example, refer to PTL 1 and PTL 2). The light-emitting device is mounted, as a so-called direct backlight, in a liquid crystal display apparatus.

CITATION LIST

Patent Literature

PTL 1: Japanese Unexamined Patent Application Publication No. 2009-140720
PTL 2: Japanese Unexamined Patent Application Publication No. 2013-247039

SUMMARY OF THE INVENTION

Recently, screen enlargement and thinning of liquid crystal display apparatuses have been pronounced. However, such screen enlargement and thinning tend to facilitate a relative positional deviation between an optical axis of a light source and a position of an aperture of a reflection plate resulting from change in dimensions of the reflection plate associated with change in temperature and humidity conditions. In general, such a relative positional deviation may cause luminance unevenness and color deviation in a light emission surface.

It is therefore desirable to provide a light-emitting device that makes it possible to emit light having less luminance unevenness and less color unevenness in a light emission surface, and a display apparatus and a lighting apparatus each of which includes the same.

A light-emitting device according to an embodiment of the present disclosure includes: (1) a light source substrate including a plurality of light sources; (2) a first reflection member including a plurality of first apertures and a first overlap portion and located to overlap a portion of the light source substrate, each of the plurality of first apertures provided at a position corresponding to a relevant one of a plurality of first light sources of the plurality of light sources, and the first overlap portion provided along an outer edge of the first reflection member; and (3) a second reflection member including a plurality of second apertures and a second overlap portion and located to overlap another portion of the light source substrate, each of the plurality of second apertures provided at a position corresponding to a relevant one of a plurality of second light sources of the plurality of light sources, and the second overlap portion provided along an outer edge of the second reflection member and overlapping the first overlap portion. Herein, the first reflection member and the second reflection member are provided at positions adjacent to each other in an in-plane direction, and are disposed to allow relative positions of the first reflection member and the second reflection member in the in-plane direction to be displaced within a range in which the first overlap portion and the second overlap portion overlap each other.

Moreover, a display apparatus and a lighting apparatus according to respective embodiments of the present disclosure each include the foregoing light-emitting device.

In the light-emitting device, the display apparatus, and the lighting apparatus according to the respective embodiments of the present disclosure, the first reflection member located on the first light sources and the second reflection member located on the second light sources are provided at positions adjacent to each other in the in-plane direction. At this occasion, the first reflection member and the second reflection member are disposed to allow relative positions of the first reflection member and the second reflection member in the in-plane direction to be displaced within the range in which the first overlap portion and the second overlap portion overlap each other. Hence, even in a case where the first reflection member and the second reflection member expand or contract due to any factor such as change in temperature and humidity conditions, such change in dimensions of the first reflection member and the second reflection member is absorbed by displacement of the relative positions in the in-plane direction. Accordingly, in a case where the first reflection member and the second reflection member expand, the first reflection member and the second reflection member move closer to each other, but do not bias each other. Hence, a relative positional deviation between positions of the light sources and positions of the apertures of the reflection members does not occur. This makes it possible to suppress an emission line having higher luminance than its surroundings in proximity to a boundary between the first reflection member and the second reflection member. In contrast, in a case where the first reflection member and the second reflection member contract, the first reflection member and the second reflection member move far away from each other. However, a portion of the first overlap portion and a portion of the second overlap portion overlap each other, which makes it possible to reduce a gap generated in proximity to the boundary between the first reflection member and the second reflection member in the in-plane direction. Thus, a decrease in luminance in proximity to the boundary is less likely to occur.

According to the light-emitting device of the embodiment of the present disclosure, the first reflection member located on the first light sources and the second reflection member located on the second light sources are disposed to allow the relative positions of the first reflection member and the second reflection member in the in-plane direction to be displaced within the range in which the first overlap portion and the second overlap portion overlap each other. Accordingly, a relative positional deviation between the first light sources and the first apertures and a relative positional deviation between the second light sources and the second apertures both resulting from any factor such as change in temperature and humidity conditions are reduced. This makes it possible to emit light having less luminance unevenness in a light emission surface. Moreover, according to the display apparatus including such a light-emitting device, it is expected to exhibit excellent picture expression. Further, according to the lighting apparatus using the light-emitting device, it is possible to perform high-quality illumination such as more homogeneous illumination on an object. It is to be noted that effects described here are non-limiting.

Effects achieved by the technology may be one or more of effects described below.

BRIEF DESCRIPTION OF THE DRAWINGS

FIG. 1 is a perspective view of an entire configuration example of a light-emitting device according to a first embodiment of the present disclosure.

FIG. 2 is a cross-sectional view of a configuration of the light-emitting device illustrated in FIG. 1.

FIG. 3A is an enlarged perspective view of a part of one reflection member illustrated in FIG. 1.

FIG. 3B is an enlarged perspective view of a part of one other reflection member illustrated in FIG. 1.

FIG. 3C is an enlarged perspective view of a region in proximity of a boundary between a pair of reflection members adjacent to each other illustrated in FIG. 1.

FIG. 4A is a first cross-sectional view for description of workings of the light-emitting device illustrated in FIG. 1.

FIG. 4B is a second cross-sectional view for description of workings of the light-emitting device illustrated in FIG. 1.

FIG. 4C is a third cross-sectional view for description of workings of the light-emitting device illustrated in FIG. 1.

FIG. 5A is a cross-sectional view of a configuration of a modification example of the light-emitting device illustrated in FIG. 1.

FIG. 5B is another cross-sectional view of the configuration of the modification example of the light-emitting device illustrated in FIG. 1.

FIG. 6 is a perspective view of a main-part configuration example of a light-emitting device according to a second embodiment of the present disclosure.

FIG. 7A is a perspective view of a first reflection member illustrated in FIG. 6.

FIG. 7B is a perspective view of a second reflection member illustrated in FIG. 6.

FIG. 7C is a perspective view of a third reflection member illustrated in FIG. 6.

FIG. 7D is a perspective view of a fourth reflection member illustrated in FIG. 6.

FIG. 8A is a first cross-sectional view for description of workings of the light-emitting device illustrated in FIG. 6.

FIG. 8B is a second cross-sectional view for description of workings of the light-emitting device illustrated in FIG. 6.

FIG. 8C is a third cross-sectional view for description of workings of the light-emitting device illustrated in FIG. 6.

FIG. 9A is an enlarged cross-sectional view of a main part of FIG. 8A.

FIG. 9B is an enlarged cross-sectional view of a main part of FIG. 8B.

FIG. 9C is an enlarged cross-sectional view of a main part of FIG. 8C.

FIG. 10 is a cross-sectional view of a configuration of a modification example of the light-emitting device illustrated in FIG. 6.

FIG. 11A is a first cross-sectional view of a main-part configuration example of a light-emitting device according to a third embodiment of the present disclosure.

FIG. 11B is a second cross-sectional view of a main-part configuration example of the light-emitting device according to the third embodiment of the present disclosure.

FIG. 11C is a third cross-sectional view of a main-part configuration example of the light-emitting device according to the third embodiment of the present disclosure.

FIG. 12 is a cross-sectional view of a configuration of a modification example of the light-emitting device illustrated in FIG. 11A.

FIG. 13 is a perspective view of an appearance of a display apparatus according to a fourth embodiment of the present disclosure.

FIG. 14A is an exploded perspective view of a main body section illustrated in FIG. 13.

FIG. 14B is an exploded perspective view of a panel module illustrated in FIG. 14A.

FIG. 15A is a perspective view of an appearance of a tablet terminal apparatus including a display apparatus of the present disclosure.

FIG. 15B is a perspective view of an appearance of another tablet terminal apparatus including the display apparatus of the present disclosure.

FIG. 16 is a perspective view of an appearance of a first lighting apparatus including a light-emitting device of the present disclosure.

FIG. 17 is a perspective view of an appearance of a second lighting apparatus including the light-emitting device of the present disclosure.

FIG. 18 is a perspective view of an appearance of a third lighting apparatus including the light-emitting device of the present disclosure.

FIG. 19A is a schematic view of a positional relationship between reflection members in an experimental example 1-1.

FIG. 19B is a schematic view of a positional relationship between reflection members in an experimental example 1-2.

FIG. 19C is a schematic view of a positional relationship between reflection members in an experimental example 1-3.

FIG. 20A is a characteristic diagram illustrating a luminance distribution in the experimental example 1-1.

FIG. 20B is a characteristic diagram illustrating a luminance distribution in the experimental example 1-2.

FIG. 20C is a characteristic diagram illustrating a luminance distribution in the experimental example 1-3.

FIG. 21A is a first characteristic diagram illustrating a difference in luminance between the experimental example 1-2 and the experimental example 1-1.

FIG. 21B is a second characteristic diagram illustrating a difference in luminance between the experimental example 1-2 and the experimental example 1-1.

FIG. 21C is a third characteristic diagram illustrating a difference in luminance between the experimental example and the experimental example 1-1.

FIG. 22A is a first characteristic diagram illustrating a difference in luminance between an experimental example 1-3 and the experimental example 1-1.

FIG. 22B is a second characteristic diagram illustrating a difference in luminance between the experimental example 1-3 and the experimental example 1-1.

FIG. 22C is a third characteristic diagram illustrating a difference in luminance between the experimental example 1-3 and the experimental example 1-1.

FIG. 23A is a first characteristic diagram illustrating a difference in luminance between a reference example 1-2 and a reference example 1-1.

FIG. 23B is a second characteristic diagram illustrating a difference in luminance between the reference example 1-2 and the reference example 1-1.

FIG. 23C is a third characteristic diagram illustrating a difference in luminance between the reference example 1-2 and the reference example 1-1.

FIG. 24A is a first characteristic diagram illustrating a difference in luminance between the reference example 1-3 and the reference example 1-1.

FIG. 24B is a second characteristic diagram illustrating a difference in luminance between the reference example 1-3 and the reference example 1-1.

FIG. 24C is a third characteristic diagram illustrating a difference in luminance between the reference example 1-3 and the reference example 1-1.

MODES FOR CARRYING OUT THE INVENTION

In the following, some embodiments of the present disclosure are described in detail with reference to drawings. It is to be noted that description is given in the following order.
1. First Embodiment and Modification Example Thereof
    An example of a light-emitting device in which a light absorbing film is provided in a boundary portion between reflection members adjacent to each other
2. Second Embodiment and Modification Example Thereof
    An example of a light-emitting device in which a light propagation path is provided in a boundary portion between reflection members adjacent to each other
3. Third Embodiment and Modification Example Thereof
    An example of another light-emitting device in which a light propagation path is provided in a boundary portion between reflection members adjacent to each other
4. Fourth Embodiment (Display apparatus; liquid crystal display apparatus)
5. Application Examples of Display Apparatus
6. Application Examples to Lighting Apparatus
7. Experimental Examples
8. Other Modification Examples

1. FIRST EMBODIMENT

[Configuration of Light-Emitting Device 10]

FIG. 1 illustrates an entire configuration of a light-emitting device 10 according to a first embodiment of the present disclosure. FIG. 2 illustrates a cross-section in a direction of an arrow taken along a line II-II of the light-emitting device 10 illustrated in FIG. 1. The light-emitting device 10 is used, for example, as a backlight illuminating a transmissive liquid crystal panel from backside or is used as a lighting apparatus in any place such as inside a room. The light-emitting device 10 includes a light source unit 1, a reflection member 2, an optical sheet 3, and a side reflection member 4.

(Light Source Unit 1)

In this specification, a thickness direction where the light source unit 1, the reflection member 2, and the optical sheet 3 are stacked is denoted as "Z direction (frontward-rearward direction)". Moreover, a rightward-leftward direction and an upward-downward direction in a main plane (a widest plane) where the light source unit 1, the reflection member 2, and the optical sheet 3 spread are respectively denoted as "X direction" and "Y direction".

In the light-emitting device 10, a plurality of light source units 1 are provided, and are so arranged in a matrix as to spread in, for example, an XY plane, thereby configuring one light source apparatus. Each of the light source units 1 includes a plurality of light sources 11 arranged in, for example, a matrix on a surface 12S of one substrate 12. Each of the light sources 11 is a point light source. Specifically, each of the light sources 11 is configured of a light emitting diode (LED) that oscillates white light. Each of the plurality of light sources 11 is disposed in a relevant one of a plurality of apertures 2K (FIG. 2) provided in the reflection member 2.

(Reflection Member 2)

A plurality of reflection members 2 are also provided as with the light source units 1, and are arranged in a matrix in the XY plane corresponding to the plurality of light source units 1, thereby configuring one reflection plate.

Each of the reflection members 2 has a function of exerting optical actions such as reflection, diffusion, and scattering on incident light. Each of the reflection members 2 includes a plurality of apertures 2K into which the light sources 11 are inserted. Each of the apertures 2K has an inner surface 2S that surrounds the light source 11 and is inclined with respect to the substrate 12. Each of the reflection members 2 has an upper surface 2T that couples upper edges of the inner surfaces 2S of the apertures 2K to one another. Herein, a thickness T2 of each of the reflection members 2 is sufficiently larger than a thickness T1 of each of the light sources 11, and is, for example, 3.4 mm (FIG. 2). Each of the apertures 2K forms, for example, a inverted truncated conical space that includes a circular lower edge having a diameter W1 and a circular upper edge having a diameter W2 (>W1) and has a plane area gradually increasing from the substrate 12 toward the optical sheet 3. The diameter W1 is, for example, 7 mm, and the diameter W2 is, for example, 8.5 mm. Moreover, an arrangement pitch (arrangement pitch of the light sources 11) PT of the apertures 2K is, for example, 11.3 mm. Note that a planar shape of each of the apertures 2K is not limited to a circular shape, and the apertures 2K may have any other shape such as an elliptical shape and a polygonal shape. It is to be noted that a central point of each of the apertures 2K in the XY plane may be coincident with an optical axis of a relevant one of the light sources 11.

The reflection members 2 are fabricated, for example, by cutting from a plate-like member or by mold injection or hot press forming. Examples of a constituent material of the reflection members 2 include a polycarbonate resin, an acrylic resin such as PMMA (a polymethyl methacrylate resin), a polyester resin such as polyethylene terephthalate, an amorphous copolymer polyester resin such as MS (a copolymer of methyl methacrylate and styrene), a polystyrene resin, and a polyvinyl chloride resin. The reflection members 2 are described in detail later.

(Side Reflection Member 4)

The side reflection member 4 is a wall member provided in a standing manner along an outermost edge of the substrate 12 so as to surround the plurality of light sources 11 from all directions. The side reflection member 4 has an inclined surface 4S inclined inward from an outer edge of the light-emitting device 10. The inclined surface 4S has a reflection function.

(Optical Sheet 3)

The optical sheet 3 is placed, for example, on an upper surface 4T of the side reflection member 4, as illustrated in FIG. 2. The optical sheet 3 is so provided as to face the light sources 11, the surface 12S of the substrate 12, and the upper surfaces 2T of the reflection members 2 to cover the plurality of light source units 1 and the plurality of reflection members 2 collectively. A gap between the surface 12S of the substrate 12 and a back surface 3S2 of the optical sheet 3 is substantially equal to a thickness T4 of the side reflection member 4, and is, for example, 8 mm. The optical sheet 3 is a sheet in which a plurality of sheet-like members are stacked. Examples of the sheet-like members include a diffusion plate, a diffusion sheet, a lens film, and a polarization separation sheet. In each of the drawings, the plurality of optical sheets are collectively illustrated as one stacked structure. Providing such an optical sheet 3 makes it possible to direct, to a front direction (the Z direction), light emitted in an oblique direction from the light source 11 or light outputted in an oblique direction from the reflection member 2, which makes it possible to further enhance front luminance.

[Detailed Configuration of Reflection Members 2]

Next, description is given of detailed configurations of the reflection members 2 with reference to FIGS. 3A, 3B, and 3C and FIGS. 4A, 4B, and 4C. FIG. 3A is an enlarged perspective view of a region in proximity to an outer edge of one reflection member 2A (refer to FIG. 1) of the plurality of reflection members 2. FIG. 3B is an enlarged perspective view of a region in proximity to an outer edge of a reflection member 2B (refer to FIG. 1) adjacent to the reflection member 2A. FIG. 3C is an enlarged perspective view of a region in proximity to a boundary between the reflection member 2A and the reflection member 2B. Note that each of FIGS. 3A, 3B, and 3C also illustrates a light source unit 1A corresponding to the reflection member 2A and a light source unit 1B corresponding to the reflection member 2B of the plurality of light source units 1. Moreover, each of FIGS. 4A, 4B, and 4C illustrates a cross section in a direction of an arrow taken along a line IV-IV of the light-emitting device 10 illustrated in FIG. 1. Note that FIG. 4A corresponds to a neutral state in which each of the reflection member 2A and the reflection member 2B is located in a reference position. In contrast, FIG. 4B corresponds to a close state in which the reflection member 2A and the reflection member 2B are closer to each other, as compared with the neutral state. Moreover, FIG. 4C corresponds to a distant state in which the reflection member 2A and the reflection member 2B are far away from each other, as compared with the neutral state.

The light source unit 1A provided directly below the reflection member 2A is a unit in which a plurality of light sources 11A are provided on a substrate 12A. The reflection member 2A includes a plurality of apertures 2KA and an overlap portion R1. Each of the plurality of apertures 2KA is provided at a position corresponding to a relevant one of the plurality of light sources 11A, and the overlap portion R1 is provided along an outer edge of the reflection member 2A. The overlap portion R1 is a portion overlapping an overlap portion R2 to be described later, and has a thinner thickness than a thickness of the other portion (hereinafter referred to as a "normal portion" for the sake of convenience) of the reflection member 2A. The thickness of the overlap portion R1 is, for example, a half or less of the thickness of the normal portion. Hence, a level difference section 23A is formed at a boundary between the normal portion and the overlap portion R1 of the reflection member 2A. The level difference section 23A is a portion to contact a locking section 22B to be described later. Moreover, in the overlap portion R1, a boundary aperture (hereinafter simply referred to as "aperture") 21A is provided at a position corresponding to some of the light sources 11A on the substrate 12A (refer to FIGS. 3A and 4A). A locking section 22A is provided in a standing manner in a portion of an outer edge of the aperture 21A.

The light source unit 1B provided directly below the reflection member 2B is a unit in which a plurality of light sources 11B are provided on a substrate 12B. The reflection member 2B includes a plurality of apertures 2KB and the overlap portion R2. Each of the plurality of apertures 2KB is provided at a position corresponding to a relevant one of the plurality of light sources 11B, and the overlap portion R2 is provided along an outer edge of the reflection member 2B. The overlap portion R2 is a portion overlapping the overlap portion R1 mentioned above, and has a thinner thickness than a thickness of the other portion (hereinafter referred to as a "normal portion" for the sake of convenience) of the reflection member 2B. The thickness of the overlap portion R2 is, for example, a half or less of the thickness of the normal portion. Hence, a level difference section 23B is formed at a boundary between the normal portion and the overlap portion R2 of the reflection member 2B. The level difference section 23B is a portion to contact the locking section 22A in the overlap portion R1. The overlap portion R2 overlaps the overlap portion R1 in a thickness direction to configure an overlap portion R (refer to FIG. 3C, and FIGS. 4A, 4B, and 4C). Moreover, in the overlap portion R2, an aperture 21B is provided at a position corresponding to the aperture 21A (refer to FIGS. 3B and 4A). The aperture 21B overlaps the aperture 21A in the thickness direction to configure one aperture 21 (refer to FIG. 3C) corresponding to a relevant one of the light sources 11A on the substrate 12A. The locking section 22B to contact the level difference section 23A mentioned above is provided in a portion of an outer edge of the aperture 21B.

In the light-emitting device 10, the plurality of reflection members 2 are so configured as to change relative positions of the plurality of reflection members 2 in an XY in-plane direction within a range in which the overlap portions of the plurality of reflection members 2 overlap each other. In other words, for example, play is secured between the reflection member 2A and the reflection member 2B to adjust the relative positions of the reflection members 2A and the reflection member 2B in the XY in-plane direction within a range in which the overlap portion R1 and the overlap portion R2 overlap each other, as illustrated in FIGS. 4A, 4B, and 4C. For example, FIG. 4A illustrates a position state in use under a normal temperature environment (for example, 20° C.), FIG. 4B illustrates a position state in use under a high temperature environment (such as a case where light sources 11 emit light for a relatively long time), and FIG. 4C illustrates a position state under a low temperature environment (such as in outdoor use in winter). Under the high temperature environment, the reflection member 2A and the reflection member 2B each expand in the XY plane by thermal expansion. Accordingly, in the state in FIG. 4B, the reflection member 2A and the reflection member 2B move closer to each other to cause the level difference section 23A to contact the locking section 22B and to cause the level difference section 23B to contact the locking section 22A. In contrast, under the low temperature environment, the reflection member 2A and the reflection member 2B each contract in the XY plane. Accordingly, in the state in FIG. 4C, the reflection member 2A and the reflection member 2B move far away from each other to largely separate the level difference section 23A and the locking section 22B from each other and to largely separate the level difference section 23B and the locking section 22A from each other.

The overlap portion R1 of the reflection member 2A includes a facing surface 24A facing the overlap portion R2 of the reflection member 2B. In contrast, the overlap portion R2 includes a facing surface 24B facing the overlap portion R1. Herein, reflectivity of the facing surface 24A is desirably lower than reflectivity of the inner surfaces S2 of the apertures 2KA, 2KB, and 21. For example, a light absorbing film 2SS may be formed on the facing surface 24A. For example, the light absorbing film 2SS faces the locking section 22B and is hidden by the locking section 22B in a reference state in FIG. 4A and the distant state in FIG. 4C, whereas the light absorbing film 2SS is exposed from the aperture 21, for example, in the close state in FIG. 4B. Hence, in the close state in FIG. 4B, part of light from the light sources 11A is absorbed by the light absorbing film 2SS to suppress reflection of the light. As the light absorbing film 2SS, for example, a fabricated product obtained by attaching a resin coating including a black pigment or a light-absorbing film to a surface of a reflection member may be applicable. Alternatively, a film obtained by collectively forming a light absorbing raw material such as a black resin on the surface of the reflection member by insert molding may be used as the light absorbing film 2SS.

The light-emitting device 10 further includes one chassis (rear housing) 5. The chassis 5 is commonly provided for the plurality of light source units 1 and the plurality of reflection members 2, and contains the plurality of light source units 1 and the plurality of reflection members 2. The chassis 5 holds each of the reflection members 2 through a connection member 6. Moreover, the chassis 5 further holds the substrate 12 in each of the light source units 1 through the connection member 6. Specifically, for example, the reflection member 2A and the chassis 5 are coupled to each other through a connection member 6A, and the reflection member 2B and the chassis 5 are coupled to each other through a connection member 6B, as illustrated in FIGS. 4A, 4B, and 4C. Moreover, the substrate 12A is held by the connection member 6A, and the substrate 12B is held by the connection member 6B. Accordingly, even in a case where expansion and contraction occur in the light-emitting device 10 due to any factor such as change in temperature and humidity, the reflection member 2 and the substrate 12 that are relevant to each other collectively move in the XY plane. In other words, the plurality of reflection members 2 adjacent to each other do not directly bias each other. This makes it possible to reduce a relative positional deviation between the reflection member 2 and the substrate 12 that are relevant to each other.

[Workings and Effects of Light-Emitting Device 10]

In the light-emitting device 10, light emitted from each of the light sources 11 spread 360° from a light-emitting point of the light source 11 to all directions, and directly enters the optical sheet 3, or is subjected to, for example, reflection on the reflection member 2 or the surface 12S of the substrate 12 to indirectly enter the back surface 3S2 of the optical sheet 3. The light having entered the optical sheet 3 passes through the optical sheet 3 to be outputted from a front surface 3S1, and thereafter the thus-outputted light is observed as surface-emitted light on outside of the optical sheet 3 (on side opposite to the light source 11).

In the light-emitting device 10, the reflection members 2 are provided, which cause light emitted from the light sources 11 to exhibit the following behavior, for example. Namely, for example, light L emitted from each of the light sources 11 is reflected by the inner surface 2S of the aperture 2K, and thereafter travels toward the optical sheet 3, as illustrated in FIG. 2. Alternatively, the light L emitted from the light source 11 reaches the back surface 3S2 of the optical sheet 3, and is further reflected, diffused or scattered on the inner surface 2S or the upper surface 2T of the reflection member 2, the surface 12S of the substrate 12, or a bottom section 33 or the inclined surface 4S of the side reflection member 4 to travel toward the optical sheet 3 again. In the light-emitting device 10 including the reflection members 2, such workings makes it possible to concentrate light onto a region to be illuminated while efficiently using light from the light sources 11 to enhance front luminance. Accordingly, an improvement in area contrast performance is expected. Moreover, a flatten luminance distribution in the XY plane is achieved so as to prevent appearance of a clear boundary between the light from one of the light sources 11 and light from another light source 11 adjacent to that the one light source 11.

Moreover, in the light-emitting device 10, the plurality of light source units 1 are arranged in a matrix to configure one light source apparatus, and the plurality of reflection members 2 are arranged in a matrix corresponding to the plurality of light source units 1 to configure one reflection plate. Further, play is provided at each of boundaries between the plurality of light source units 1 and boundaries between the plurality of reflection members 2. This makes it possible to relatively displace the plurality of light source units 1 within a predetermined range without causing the plurality of light source units 1 to bias each other and to relatively displace the plurality of reflection members 2 within a predetermined range without causing the plurality of reflection members 2 to bias each other. Thus, even in a case where expansion or contraction occurs due to any factor such as change in temperature and humidity conditions in each of the plurality of reflection members 2, such change in dimensions of each of the plurality of reflection members 2 is absorbed by displacement of the relative positions of the plurality of reflection members 2 in the XY in-plane direction.

For example, in a case where the reflection member 2A and the reflection member 2B expand, the reflection member 2A and the reflection member 2B move closer to each other, but do not bias each other. Accordingly, relative positional deviations between positions of the light sources 11A and 11B and positions of the apertures 2KA and 2KB of the reflection members 2A and 2B are less likely to occur. As a result, even in a case where the reflection member 2A and the reflection member 2B move closer to each other, it is possible to suppress generation of an emission line in proximity to a boundary between the reflection member 2A and the reflection member 2B. In particular, the light absorbing film 2SS is provided on the facing surface 24A in the overlap portion R1 of the reflection member 2A to reduce reflectivity of the facing surface 24A, which makes it possible to effectively suppress generation of an emission line in proximity to such a boundary.

In contrast, in a case where the reflection member 2A and the reflection member 2B contract, the reflection member 2A and the reflection member 2B move far away from each other. However, a portion of the overlap portion R1 and a portion of the overlap portion R2 overlap each other, which makes it possible to reduce a gap generated in proximity to the boundary between the reflection number 2A and the reflection member 2B in the in-plane direction. Accordingly, a decrease in luminance in proximity to the boundary is less likely to occur, which makes it possible to suppress generation of a dark line.

For the reasons mentioned above, in the light-emitting device 10, it is possible to emit light having less luminance unevenness (light having a flat luminance distribution) in a light emission surface (in the XY plane) as a whole. Moreover, in a case where such a light-emitting device 10 is used for a display apparatus, it is expected that the display apparatus displays excellent picture expression.

Modification Example of First Embodiment

Each of FIGS. 5A and 5B is a cross-sectional view of a main part of a light-emitting device 10A as a modification example of the light-emitting device 10 according to the foregoing first embodiment. In the light-emitting device 10 according to the foregoing first embodiment, the light absorbing film 2SS is provided on the upward facing surface 24A in the overlap portion R1 located below the overlap portion R2 to reduce reflection of light while the reflection members 2 are closer to each other. In contrast, in the light-emitting device 10A of the modification example, the light absorbing film 2SS is provided on the downward facing surface 24B in the overlap portion R2 located above the overlap portion R1. Accordingly, reflectivity of the facing surface 24B is lower than reflectivity of the inner surfaces 2S of the aperture 2KA, 2KB, and 21. It is to be noted that FIG. 5A corresponds to the neutral state in which each of the reflection member 2A and the reflection member 2B is located at the reference position. Moreover, FIG. 5B corresponds to the close state in which the reflection member 2A and the reflection member 2B are closer to each other, as compared with the neutral state.

Even in the modification example, in the close state illustrated in FIG. 5B, the light absorbing film 2SS provided on the facing surface 24B is exposed from the aperture 21. Accordingly, even in the close state in FIG. 5B, part of light from the light sources 11A is absorbed by the light absorbing film 2SS to suppress reflection of the light. This makes it possible to effectively suppress generation of an emission line in proximity to such a boundary between the reflection members 2.

2. SECOND EMBODIMENT

[Configuration of Light-Emitting Device 20]

Description is given of a light-emitting device 20 according to a second embodiment of the present disclosure mainly with reference to FIGS. 6 to 9C. The light-emitting device 20 has the same configuration as the configuration of the light-emitting device 10 according to the foregoing first embodiment, except that the configurations of the reflection members 2 are different.

FIG. 6 is an enlarged perspective view of a main-part configuration (in proximity to a boundary among the reflection members 2A to 2D illustrated in FIG. 1) of the light-emitting device 20. The reflection members 2A to 2D are arranged, for example, in a matrix, as illustrated in FIGS. 1 and 6. For example, an overlap portion RY extending in an Y axis direction is formed between the reflection member 2A and the reflection member 2B disposed side by side in an X axis direction and between the reflection member 2C and the reflection member 2D disposed side by side in the X axis direction. Moreover, an overlap portion RX extending in the X axis direction is formed between the reflection member 2A and the reflection member 2C disposed side by side in the Y axis direction and between the reflection member 2B and the reflection member 2D disposed side by side in the Y axis direction.

FIGS. 7A, 7B, 7C, and 7D are respectively exploded perspective view of the plurality of reflection members 2A to 2D illustrated in FIG. 6.

Moreover, each of FIGS. 8A, 8B, and 8C is an enlarged cross-sectional view of a region in proximity to the boundary between the reflection member 2A and the reflection member 2B adjacent to each other in the light-emitting device 20, and corresponds to a cross section in a direction of an arrow taken along a line VIII-VIII illustrated in FIGS. 7A and 7B. Moreover, FIGS. 9A, 9B, and 9C are respectively enlarged cross-sectional views of portions of FIGS. 8A, 8B, and 8C. Note that FIGS. 8A and 9A correspond to the neutral state in which each of the reflection member 2A and the reflection member 2B is located at the reference position. FIGS. 8B and 9B correspond to the close state in which the reflection member 2A and the reflection member 2B are closer to each other, as compared with the neutral state. Moreover, FIGS. 8C and 9C correspond to the distant state in which the reflection member 2A and the reflection member 2B are far away from each other, as compared with the neutral state.

The reflection member 2A includes an overlap portion R1Y extending in the Y axis direction along an outer edge of the reflection member 2A and an overlap portion R1X extending in the X axis direction along the outer edge of the reflection member 2A, as illustrated in FIG. 7A. In the overlap portion R1Y, a plurality of apertures 21AY are provided side by side in the Y axis direction corresponding to the plurality of light sources 11A provided side by side at an outermost edge of the substrate 12A. Each of the apertures 21AY overlaps a notch 21BY (to be described later) of the reflection member 2B in the thickness direction to configure a boundary aperture (hereinafter simply referred to as "aperture") 21AB (FIG. 6) located in a boundary portion between the reflection member 2A and the reflection member 2B. A locking section 26AY is provided at an outermost edge of the overlap portion R1Y. The locking section 26AY faces and overlaps a level difference section 25BY (to be described later) of the reflection member 2B. Moreover, in the overlap portion R1X of the reflection member 2A, a plurality of notches 21AX having a half-round planar shape are provided side by side in the X axis direction. Each of the notches 21AX overlaps an aperture 21CX (to be described later) of the reflection member 2C in the thickness direction to configure an aperture 21AC (FIG. 6) located in a boundary portion between the reflection member 2A and the reflection member 2C. In each of the notches 21AX, a level difference section 25AX is formed. The level difference section 25AX is configured to be contactable with a locking section 26CY (to be described later) of the reflection member 2C adjacent in the Y axis direction of the reflection member 2A.

The reflection member 2B includes an overlap portion R2Y extending in the Y axis direction along an outer edge of the reflection member 2B and an overlap portion R2X extending in the X axis direction along the outer edge of the reflection member 2B, as illustrated in FIG. 7B. The reflection member 2A and the reflection member 2B are disposed so that the overlap portion R1Y and the overlap portion R2Y overlap each other, and configure a part of the overlap portion RY. In the overlap portion R2Y, the notch 21BY overlapping the aperture 21AY to configure the aperture 21AB is provided. In the notch 21BY, the level difference section 25BY is formed. The level difference section 25BY is configured to be contactable with the locking section 26AY of the reflection member 2A. A concave section 25U is formed in a portion facing the locking section 26AY of the level difference section 25BY (refer to FIGS. 8A, 8B, and 8C). Moreover, in the overlap portion R2X, a plurality of notches 21BX having a half-round planar shape are provided side by side in the Y axis direction corresponding to a plurality of light sources 11D disposed side by side at an outermost edge of the substrate 12D (FIG. 6) facing the reflection member 2D (FIG. 7B). Each of the notches 21BX overlaps an aperture 21DX (to be described later) of the reflection member 2B in the thickness direction to configure an aperture 21BD (FIG. 6) located in a boundary portion between the reflection member 2B and the reflection member 2D. In each of the notches 21BX, a level difference section 25BX is formed. The level difference section 25BX is configured to be contactable with a locking section 26DX (to be described later) of the reflection member 2D adjacent in the Y axis direction to the reflection member 2B. The concave section 25U is also formed in a portion facing the locking section 26DX of the level difference section 25BX.

The reflection member 2C includes an overlap portion R3Y extending in the Y axis direction along an outer edge of the reflection member 2C and an overlap portion R3X extending in the X axis direction along the outer edge of the reflection member 2C, as illustrated in FIG. 7C. The reflection member 2A and the reflection member 2C are disposed so that the overlap portion R1X and the overlap portion R3X overlap each other, and configure a part of the overlap portion RX. In the overlap portion R3Y, a plurality of apertures 21CY are provided side by side in the Y axis direction corresponding to a plurality of light sources 11C disposed side by side at an outermost edge of the substrate 12C (FIG. 6). Each of the apertures 21CY overlaps a notch 21DY (to be described later) of the reflection member 2D in the thickness direction to configure an apertures 21CD (FIG. 6) located in a boundary portion between the reflection member 2C and the reflection member 2D. The locking section 26CY is provided at an outermost edge of the overlap portion R3Y. The locking section 26CY faces and overlaps a level difference section 25DY (to be described later) of the reflection member 2D. Moreover, in the overlap portion R3X of the reflection member 2C, a plurality of apertures 21CX are provided side by side in the X axis direction. In each of the apertures 21CX, a locking section 26CX is formed. The locking section 26CX is configured to be contactable with the level difference section 25AX of the reflection member 2A.

The reflection member 2D includes an overlap portion R4Y extending in the Y axis direction along an outer edge of the reflection member 2D and an overlap portion R4X extending in the X axis direction along the outer edge of the reflection member 2D, as illustrated in FIG. 7D. The reflection member 2B and the reflection member 2D are disposed so that the overlap portion R2X and the overlap portion R4X overlap each other, and configure a part of the overlap portion RX. Moreover, the reflection member 2C and the reflection member 2D are disposed so that the overlap portion R3Y and the overlap portion R4Y overlap each other, and configure a part of the overlap portion RY. In the overlap portion R4Y of the reflection member 2D, a plurality of notches 21DY having a half-round planar shape are provided side by side in the Y axis direction. In each of the notches 21DY, the level difference section 25DY is formed. The level difference section 25DY is configured to be contactable with the locking section 26DY of the reflection member 2C. The concave section 25U is also formed in a portion facing the locking section 26CY of the level difference section 25DY. Moreover, in the overlap portion R4X, a plurality of apertures 21DX are provided side by side in the X axis direction corresponding to the plurality of light sources 11D disposed side by side at the outermost edge of the substrate 12D (FIG. 6). Each of the apertures 21DX overlap a relevant one of the notches 21BX of the reflection member 2B in the thickness direction to configure the aperture 21BD (FIG. 6) located at the boundary portion between the reflection member 2B and the reflection member 2D. The locking section 26DX is provided at an outermost edge of the overlap portion R4X. The locking section 26DX faces and overlaps the level difference section 25BX of the reflection member 2B.

Even in the light-emitting device 20, as with the light-emitting device 10, the plurality of reflection members 2 are so configured as to change relative positions of the plurality of reflection members 2 in the XY in-plane direction within a range in which the overlap portions of the plurality of reflection members 2 overlap each other. In other words, for example, play is secured between the reflection member 2A and the reflection member 2B to adjust the relative positions of the reflection member 2A and the reflection member 2B in the XY in-plane direction within a range in which the overlap portion R1Y and the overlap portion R2Y overlap each other, as illustrated in FIGS. 8A, 8B, and 8C. FIGS. 8A and 9A each illustrate a position state in use under the normal temperature environment (for example, 20° C.), FIGS. 8B and 9B each illustrate a position state in use under the high temperature environment, and FIGS. 8C and 9C each illustrate a position state under the low temperature environment. Herein, a front end 25T of the level difference section 25BY and the locking section 26AY exhibit a function such as an open-close valve that controls a light transmission amount, for example, by changing the relative positions in the X axis direction.

Under the normal temperature environment in FIGS. 8A and 9A, the front end 25T of the level difference section 25BY contact an upper end of the locking section 26AY, or is close to the upper end of the locking section 26AY with a slight gap in between (refer to an enclosed portion IX in FIG. 9A). Accordingly, light emitted from the light sources 11A hardly enters a gap between the level difference section 25BY and the locking section 26AY. In contrast, under the high temperature environment, the reflection member 2A and the reflection member 2B each expand in the XY plane by thermal expansion. Accordingly, in the state in FIGS. 8B and 9B, the reflection member 2A and the reflection member 2B move closer to each other, and the locking section 26AY and the level difference section 25BY move closer to each other. Note that in this case, for example, an end surface of the substrate 12A and an end surface of the substrate 12B contact each other, which maintains a state in which the locking section 26AY and the level difference section 25BY are slightly separated from each other. In contrast, the front end 25T of the level difference section 25BY is in a state in which the front end 25T is separated from the locking section 26AY (refer to an enclosed portion IX in FIG. 9B). Thus, a propagation path 27 of light from inside of the aperture 21AB to the chassis 5 via the gap between the locking section 26AY and the level difference section 25BY is formed.

Moreover, under the low temperature environment, the reflection member 2A and the reflection member 2B each contract in the XY plane. Accordingly, in the state in FIGS. 8C and 9C, the reflection member 2A and the reflection member 2B move far away from each other, as compared with the state in FIGS. 8A and 9C. However, displacement amounts of the reflection members 2A and 2B fall within a range in which the front end 25T of the level difference section 25BY overlaps the locking section 26AY. Accordingly, the front end 25T of the level difference section 25BY and the locking section 26AY face each other and contact each other, or a gap between the front end 25T of the level difference section 25BY and the locking section 26AY hardly exists, which blocks the propagation path 27 of light (refer to an enclosed portion IX in FIG. 9C).

As described above, in the light-emitting device 20, effects similar to the effects in the light-emitting device 10 are expected. In other words, even in a case where expansion or contraction occurs due to any factor such as change in temperature and humidity conditions in each of the plurality of reflection members 2, such change in dimensions of each of the plurality of reflection members 2 is absorbed by displacement of the relative positions of the plurality of reflection members 2 in the XY in-plane direction. Accordingly, a relative positional deviation between a position of each of the light sources 11 and a position of each of the apertures 2K of the reflection members 2 is less likely to occur, which makes it possible to suppress generation of an emission line in proximity to a boundary between the reflection members 2. In particular, the open-close valve for light is provided in proximity to the boundary between the reflection members 2 to form the propagation path 27 of light that releases redundant light in a case where the reflection members 2 are closer to each other, which makes it possible to effectively suppress generation of an emission line in proximity to such a boundary.

In contrast, in a case where the reflection members 2 contract, the overlap portions RX and RY are provided to suppress generation of a gap in proximity to the boundary between adjacent reflection members 2. This makes it possible to suppress generation of a dark line in proximity to the boundary.

For the reasons mentioned above, in the light-emitting device 20, it is possible to emit light having less luminance unevenness in the light emission surface (in the XY plane) as a whole. Moreover, in a case where such a light-emitting device 20 is used for a display apparatus, it is expected that the display apparatus displays excellent picture expression.

Modification Example of Second Embodiment

FIG. 10 is a cross-sectional view of a main part of a light-emitting device 20A as a modification example of the light-emitting device 20 according to the foregoing second embodiment. The light-emitting device 20A as the modification example has substantially the same configuration as the configuration of the foregoing light-emitting device 20, except that a light absorbing film 25SS is provided on the concave section 25U of the level difference section 25BY. Providing the light absorbing film 25SS on the concave section 25U of the level difference section 25BY facing the locking section 26AY makes it possible to reduce reflectivity of the level difference section 25BY lower than reflectivity of an inner surface of the aperture 21AB. In other words, in the modification example, light entering the propagation path 27 while the reflection members 2 are closer to each other is absorbed by the light absorbing film 25SS. This makes it possible to more effectively suppress generation of an emission line in proximity to the boundary between the reflection members 2. It is to be noted that in FIG. 10, the light absorbing film 25SS is provided on the concave section 25U; however, a light absorbing film may be provided on a surface facing the concave section 25U of the locking section 26AY, for example. Alternatively, the light absorbing films may be provided on both the level difference section 25BY and the locking section 26AY. Moreover, the light absorbing film may be provided on any portion of a plane where the level difference section 25BY and the locking section 26AY face each other.

3. THIRD EMBODIMENT

[Configuration of Light-Emitting Device 30]

Description is given of a light-emitting device 10 according to a third embodiment of the present disclosure mainly with reference to FIGS. 11A, 11B, and 11C. The light-emitting device 30 has the same configuration as the configuration of the light-emitting device 10 according to the foregoing first embodiment, except that the configurations of the reflection members 2 are different. Specifically, in the foregoing light-emitting device 10, for example, the light absorbing film 2SS is provided on the facing surface 24A of the level difference section 23A in the reflection member 2A. In contrast, in the light-emitting device 30 according to the present embodiment, a through hole 28 from the facing surface 24A to the substrate 12A is provided in the level difference section 23A.

FIGS. 11A, 11B, and 11C each illustrate a cross section of the light-emitting device 30, and respectively correspond to FIGS. 4A, 4B, and 4C in the first embodiment. Specifically, FIG. 11A illustrates the neutral state in which each of the reflection member 2A and the reflection member 2B is located at the reference position, and corresponds to FIG. 4A. FIG. 11B illustrates the close state in which the reflection member 2A and the reflection member 2B are closer to each other, and corresponds to FIG. 4B. FIG. 11C illustrates the distant state in which reflection member 2A and the reflection member 2B are far away from each other, and corresponds to FIG. 4C.

Even in the light-emitting device 30, as with the light-emitting device 10, the plurality of reflection members 2 are so configured as to change relative positions of the plurality of reflection members 2 in the XY in-plane direction within a range in which the overlap portions of the plurality of reflection members 2 overlap each other. In other words, for example, play is secured between the reflection member 2A and the reflection member 2B to adjust the relative positions of the reflection member 2A and the reflection member 2B in the XY in-plane direction in an overlap portion R, as illustrated in FIGS. 11A, 11B, and 11C. Hence, according to the light-emitting device 30, as with the light-emitting device 10, it is possible to reduce luminance unevenness in the light emission surface (in the XY plane) as a whole.

Moreover, in the light-emitting device 30, the level difference section 23A of the reflection member 2A and the locking section 22B of the reflection member 2B exhibit a function such as an open-close valve that controls a light transmission amount, for example, by changing the relative positions in the X axis direction. Specifically, in the neutral state in FIG. 11A and the distant state in FIG. 11C, the locking section 22B of the reflection member 2B is located at a position blocking the through hole 28 of the reflection member 2A. In contrast, in the close state in FIG. 11B, the locking section 22B passes through the through hole 28, and the through holes 28 is exposed from the aperture 21. Accordingly, a propagation path 29 of light from inside of the aperture 21 to the chassis 5 via the through hole 28 is formed. Thus, the open-close valve for light is provided in proximity to the boundary between the reflection members 2 to form the propagation path 29 of light that releases redundant light in the case where the reflection members 2 are closer to each other, which makes it possible to effectively suppress generation of an emission line in proximity to such a boundary.

Modification Example of Third Embodiment

FIG. 12 is a cross-sectional view of a main part of a light-emitting device 30A as a modification example of the light-emitting device 30 according to the foregoing third embodiment. The light-emitting device 30A as the modification example has substantially the same configuration as the configuration of the foregoing light-emitting device 30, except that a light absorbing film 28SS is provided on an inner surface of the through hole 28 of the level difference section 23A. Providing the light absorbing film 28SS on the inner surface of the through hole 28 makes it possible to reduce reflectivity of the inner surface of the through hole 29 lower than reflectivity of the inner surface of the aperture 21. In other words, in the modification example, light entering the propagation path 29 while the reflection members 2 are closer to each other is absorbed by the light absorbing film 28SS. This makes it possible to more effectively suppress generation of an emission line in proximity to the boundary between the reflection members 2.

4. FOURTH EMBODIMENT

FIG. 13 illustrates an appearance of a display apparatus 101 according to a fourth embodiment of the present technology. The display apparatus 101 includes the light-emitting device 10, and is used as, for example, a flat-screen television. The display apparatus 101 has a configuration in which a flat tabular main body section 102 for image display is supported by a stand 103. It is to be noted that the display apparatus 101 is used as a stationary type that stands on a level surface such as a floor, a shelf, or a table with the stand 103 attached to the main body section 102; however, the display apparatus 101 may be used as a wall-mounted type with the stand 103 detached from the main body section 102.

FIG. 14A illustrates the main body section 102 illustrated in FIG. 13 in an exploded manner. The main body section 102 includes, for example, a front exterior member (bezel) 111, a panel module 112, and a rear exterior member (rear cover) 113 in this order from front side (viewer side). The front exterior member 111 is a frame-shaped member that covers a front circumferential portion of the panel module 112, and a pair of speakers 114 are disposed on the lower side of the front exterior member 111. The panel module 112 is fixed to the front exterior member 111, and a power source board 115 and a signal board 116 are mounted on the rear side of the panel module 112, and a mounting fixture 117 is fixed on the rear side of the panel module 112. The mounting fixture 117 is adapted for mounting of a wall-mounting bracket, mounting of a board etc., and mounting of the stand 103. The rear exterior member 113 covers a rear surface and side surfaces of the panel module 112.

FIG. 14B illustrates the panel module 112 illustrated in FIG. 14A in an exploded manner. The panel module 112 includes, for example, a front chassis (top chassis) 121, a liquid crystal panel 122, a frame-shaped member (middle chassis) 80, the optical sheet 3, the reflection members 2, the light source units 1, the side reflective member 4, a rear chassis (back chassis) 124, and a timing controller board 127 in this order from the front side (viewer side).

The front chassis 121 is a frame-shaped metallic component that covers a front circumferential portion of the liquid crystal panel 122. The liquid crystal panel 122 has, for example, a liquid crystal cell 122A, a source substrate 122B, and a flexible substrate 122C such as a COF (Chip On Film). The flexible substrate 122C couples the liquid crystal cell 122A the source substrate 122B together. The frame-shaped member 123 is a frame-shaped resin component that holds the liquid crystal panel 122 and the optical sheet 3. The rear chassis 124 is a metallic component of a metal such as iron (Fe), and contains the liquid crystal panel 122, the frame-shaped member 123, and the light-emitting device 10. The timing controller board 127 is also mounted on the rear side of the rear chassis 124.

In the display apparatus 101, light from the light-emitting device 10 is selectively transmitted by the liquid crystal panel 122 to perform image display. Herein, the display apparatus 101 includes the light-emitting device 10 having improved homogeneity of the in-plane luminance distribution as described in the first embodiment, resulting in enhancement of display quality of the display apparatus 101.

5. APPLICATION EXAMPLES OF DISPLAY APPARATUS

Hereinafter, description is given of application examples of the foregoing display apparatus 101 to electronic apparatuses. Examples of the electronic apparatuses include a television, a digital camera, a notebook personal computer, a mobile terminal apparatus such as a mobile phone, and a video camera. In other words, the foregoing display apparatus is applicable to electronic apparatuses in every field that display externally inputted image signals or internally generated image signals as images or video pictures.

FIG. 15A illustrates an appearance of a tablet terminal apparatus to which the display apparatus 101 according to the foregoing embodiment is applied. FIG. 15B illustrates an appearance of another tablet terminal apparatus to which the display apparatus 101 according to the foregoing embodiment is applied. Each of these tablet terminal apparatuses includes, for example, a display section 210 and a non-display section 220, and the display section 210 is configured of the display apparatus 101 according to the foregoing embodiment.

6. APPLICATION EXAMPLES TO LIGHTING APPARATUSES

Each of FIGS. 16 and 17 illustrates an appearance of a desktop lighting apparatus to which, for example, the light-emitting device 10 according to the foregoing embodiment is applied. For example, this lighting apparatus includes a lighting section 843 that is attached to a supporting post 842 provided on a base mount 841, and the lighting section 843 is configured of, for example, the light-emitting device 10. Forming, for example, the substrate 12, the reflection members 2, and the optical sheet 3 in curved shapes allows the lighting section 843 to take any form, such as a cylindrical shape illustrated in FIG. 16 or a curved shape illustrated in FIG. 17.

FIG. 18 illustrates an appearance of an indoor lighting apparatus to which, for example, the light-emitting device 10 is applied. This lighting apparatus includes, for example, lighting sections 844 each of which is configured of, for example, the light-emitting device 10. An appropriate number of the lighting sections 844 are disposed at appropriate spacing intervals on a ceiling 850A of a building. It is to be noted that installation locations of the lighting sections 844 are not limited to the ceiling 850A, but the lighting sections 844 may be installed at any location such as a wall 850B or a floor (not illustrated) depending on the intended use.

In these lighting apparatuses, illumination is performed using light from, for example, the light-emitting device 10. Herein, the lighting apparatuses each include, for example, the light-emitting device 10 having improved homogeneity of the in-plane luminance distribution, resulting in enhancement of illumination quality.

7. EXPERIMENTAL EXAMPLES

Experimental Examples 1-1 to 1-3

A sample of the light-emitting device 20 according to the foregoing second embodiment was fabricated, and change in light emission luminance distribution of the sample was measured. Specifically, the light sources 11 in regions corresponding to the reflection members 2A to 2D of the light-emitting device 20 were turned on, and the relative positions of the reflection members 2A to 2D were changed to measure the luminance distribution. Positional relationships of the reflection members 2A to 2D in experimental examples 1-1 to 1-3 are schematically illustrated in FIGS. 19A, 19B, and 19C, respectively.

In the experimental example 1-1, the reflection members 2A to 2D were located at respective reference positions in FIG. 8A, as illustrated in FIG. 19A. In FIG. 19A, central positions of the reflection members 2A to 2D are referred to as P1 to P4, respectively, and coordinates (X, Y) of each of the central positions are (0, 0).

In the experimental example 1-2, the reflection members 2A to 2D were displaced toward the X axis direction, as illustrated in FIG. 19B. Specifically, the reflection members 2A and 2D were displaced by 0.3 mm toward a −X direction, and the reflection members 2B and 2C were displaced by 0.3 mm toward a +X direction. In other words, the coordinates (X, Y) of the central positions P1 and P4 were (−0.3, 0), and the coordinates (X, Y) of the central positions P2 and P3 were (+0.3, 0). It is to be noted that in the drawing, a hollow circle "○" represents the reference position of each of the central positions P1 to P4 before displacement, and a black circle "●" represents each of the central positions P1 to P4 after displacement.

In the experimental example 1-3, the reflection members 2A to 2D were displaced toward the Y axis direction, as illustrated in FIG. 19C. Specifically, the reflection members 2A and 2D were displaced by 0.3 mm toward the −Y direction, and the reflection members 2B and 2C were displaced by 0.3 mm toward the +Y direction. In other words, the coordinates (X, Y) of each of the central positions P1 and P4 were (0, −0.3), and the coordinates (X, Y) of each of the central positions P2 and P3 were (0, +0.3). It is to be noted that in the drawing, a hollow circle "○" represents the reference position of each of the central positions P1 to P4 before displacement, and a black circle "●" represents each of the central positions P1 to P4 after displacement.

The luminance distributions of the light-emitting device 20 in the experimental examples 1-1 to 1-3 are respectively illustrated in FIGS. 20A, 20B, and 20C. In FIGS. 20A, 20B, and 20C, a horizontal axis indicates a position in the X axis direction of the light-emitting device 20, and a vertical axis indicates a position in the Y axis direction of the light-emitting device 20.

It is difficult to recognize a difference in the luminance distribution in FIGS. 20A, 20B, and 20C; therefore, a change of luminance in the experimental example 1-2 with respect to luminance in the experimental example 1-1 was calculated, and a distribution of the change of luminance in the XY plane is illustrated in FIGS. 21A, 21B, and 21C. Likewise, a change of luminance in the experimental example 1-3 with respect to luminance in the experimental example 1-1 was calculated, and a distribution of the change of luminance in the XY plane is illustrated in FIGS. 22A, 22B, and 22C. FIGS. 21A and 22A each illustrate a change of luminance by color in steps of 1%. FIGS. 21B and 22B each illustrate a change of luminance by a counter line in steps of 2%. Moreover, FIG. 21C illustrates a change of luminance in each of cross sections taken along a line X1-X1 and a line X2-X2 illustrated in FIG. 21B. Likewise, FIG. 22C illustrates a change of luminance in each of cross sections taken along a line Y1-Y1 and a line Y2-Y2 illustrated in FIG. 22B.

Reference Examples 1-1 to 1-3

As reference examples corresponding to the foregoing experimental examples 1-1 to 1-3, a light-emitting device including reflection members 502A to 502D each of which did not include an overlap portion was fabricated, and an experiment similar to the experiment in the experimental examples 1-1 to 1-3 was performed. Results of the experiment are illustrated in FIGS. 23A, 23B and 23C and FIGS. 24A, 24B, and 24C. Specifically, a change of luminance in the reference example 1-2 with respect to luminance in the reference example 1-1 was calculated, and a distribution of the change of luminance in the XY plane is illustrated in FIGS. 23A, 23B, and 23C. Likewise, a change of luminance in the reference example 1-3 with respect to luminance in the reference example 1-1 was calculated, and a distribution of the change of luminance in the XY plane is illustrated in FIGS. 24A, 24B, and 24C. FIGS. 23A and 24A each illustrate a change of luminance by color in steps of 1%. FIGS. 23B and 24B each illustrate a change of luminance by a counter line in steps of 2%. Moreover, FIG. 23C illustrates a change of luminance in each of cross sections taken along a line XX1-XX1 and a line XX2-XX2 illustrated in FIG. 23B. Likewise, FIG. 24C illustrates a change of luminance in each of cross sections taken along a line YY1-YY1 and a line YY2-YY2 illustrated in FIG. 23B.

In a case where the reflection members 2A to 2D were displaced from the reference positions toward the X axis direction, a region 51 enclosed by a broken line had higher luminance than its surroundings, as illustrated in FIGS. 21A 21B and 21C. The reflection member 2C and the reflection member 2D moved closer to each other to increase an overlap portion between light from the light source 11C corresponding to the reflection member 2C and light from the light source 11D corresponding to the reflection member 2D in proximity to a boundary between the reflection member 2C and the reflection member 2D, which is considered to cause such a result. In contrast, luminance in a region enclosed by a broken line had lower luminance than its surroundings. The reflection member 2A and the reflection member 2B moved far away from the respective reference positions to decrease an overlap portion between light from the light source 11 corresponding to the reflection member 2A and light from the light source 11B corresponding to the reflection member 2B in proximity to a boundary between the reflection member 2A and the reflection member 2B, which is considered to cause such a result.

Likewise, in a case where the reflection members 2A to 2D were displaced from the reference positions toward the Y axis direction, a region 53 enclosed by a broken line had higher luminance than its surroundings, as illustrated in FIGS. 22A to 2C. The reflection member 2A and the reflection member 2C moved closer to each other to increase an overlap portion between light from the light source 11A corresponding to the reflection member 2A and light from the light source 11C corresponding to the reflection member 2C in proximity to a boundary between the reflection member 2A and the reflection member 2C, which is considered to cause such a result. In contrast, luminance in a region 54 enclosed by a broken line had lower luminance than its surroundings. The reflection member 2B and the reflection member 2D moved far away from the respective reference positions to decrease an overlap portion between light from the light source 11B corresponding to the reflection member 2B and light from the light source 11D corresponding to the reflection member 2D in proximity to a boundary between the reflection member 2B and the reflection member 2D, which is considered to cause such a result.

As described above, according to the experimental examples 1-1 to 1-3, displacement of the reflection members 2 causes a slight change in luminance distribution. However, as compared with the results of the reference examples 1-1 to 1-3 illustrated in FIGS. 23A, 23B and 23C and FIGS. 24A, 24B and 24C, it was confirmed that a deviation in the luminance distribution was largely relieved in the experimental examples. For example, an increase in luminance in the region 51 in the present experimental examples is smaller than an increase in luminance in a region 151 illustrated in FIG. 23A, and a decrease in luminance in the region 52 in the present experimental examples is smaller than a decrease in luminance in the region 152 illustrated in FIG. 23B. Likewise, an increase in luminance in the region 53 in the present experimental examples is smaller than an increase in luminance in the region 153 illustrated in FIG. 24A, and a decrease in luminance in the region 54 in the present experimental examples is smaller than a decrease in luminance in the region 154 illustrated in FIG. 24B.

As described above, according to the light-emitting device of the invention, it was confirmed that it was possible to effectively suppress generation of an emission line and generation of a dark line in proximity to the boundary between the plurality of reflection members arranged so as to spread in the light emission surface (in the XY plane), and it was possible to emit light having less luminance unevenness in the light emission surface as a whole.

8. OTHER MODIFICATION EXAMPLES

Although the description has been given by referring to some embodiments and the modification examples, the present disclosure is not limited thereto, and may be modified in a variety of ways. For example, the number of divided reflection members, the shapes of the reflection members, and the configurations of the overlap portions described in the foregoing embodiments and examples are illustrative, and the number of divided reflection members, the shapes of the reflection members, and the configurations of the overlap portions are not limited thereto.

Moreover, in the foregoing embodiments and examples, description has been given by referring to an example in which the first light sources are provided on a first light source substrate and the second light sources are provided on a second light source substrate; however, the present disclosure is not limited to the example. In place of the plurality of divided light source substrates, one light source substrate configured of an integration of the plurality of light source substrates is prepared, and all the plurality of light sources may be provided on the one light source substrate.

Moreover, the number of divided light source substrates and the number of divided reflection members may not be equal to each other.

Further, for example, the light-emitting devices and the display apparatuses described in the foregoing embodiments and examples are not limited to a case where all components described above are provided. Some of the components may be omitted, or any other components may be provided.

It is to be noted that the effects described in the present specification are illustrative and non-limiting. Effects achieved by the present disclosure may be effects other than those described above. Further, the present technology may have the following configurations.

(1)

A light-emitting device, including:

a light source substrate including a plurality of light sources;

a first reflection member including a plurality of first apertures and a first overlap portion and located to overlap a portion of the light source substrate, each of the plurality of first apertures provided at a position corresponding to a relevant one of a plurality of first light sources of the plurality of light sources, and the first overlap portion provided along an outer edge of the first reflection member; and a second reflection member including a plurality of second apertures and a second overlap portion and located to overlap another portion of the light source substrate, each of the plurality of second apertures provided at a position corresponding to a relevant one of a plurality of second light sources of the plurality of light sources, and the second overlap portion provided along an outer edge of the second reflection member and overlapping the first overlap portion, in which the first reflection member and the second reflection member are provided at positions adjacent to each other in an in-plane direction, and are disposed to allow relative positions of the first reflection member and the second reflection member in the in-plane direction to be displaced within a range in which the first overlap portion and the second overlap portion overlap each other.

(2)

The light-emitting device according to (1), in which the first overlap portion includes a boundary aperture and a first facing surface, the boundary aperture being some of the plurality of first apertures, and the first facing surface facing the second overlap portion, in a close state in which the first reflection member and the second reflection member are relatively close to each other, the first facing surface is exposed from the boundary aperture, and reflectivity of the first facing surface is lower than reflectivity of an inner surface of the boundary aperture.

(3)

The light-emitting device according to (2), in which a light absorbing film is provided on the first facing surface.

(4)

The light-emitting device according to (1), in which the first overlap portion includes a boundary aperture being some of the plurality of first apertures, the second overlap portion includes a second facing surface facing the first overlap portion, in a close state in which the first reflection member and the second reflection member are relatively close to each other, the second facing surface is exposed from the boundary aperture, and reflectivity of the second facing surface is lower than reflectivity of an inner surface of the boundary aperture.

(5)

The light-emitting device according to (4), in which a light absorbing film is provided on the second facing surface.

(6)

The light-emitting device according to (1), in which the first overlap portion including a boundary aperture and a first facing section, the boundary aperture being some of the plurality of first apertures, and the first facing section facing the second overlap portion, the second overlap portion includes a second facing section facing the first facing section, and in a close state in which the first reflection member and the second reflection member are relatively close to each other, the first facing section and the second facing section move far away from each other to form a light propagation path from an inner surface of the boundary aperture to the light source substrate.

(7)

The light-emitting device according to (6), in which in a second state in which the first reflection member and the second reflection member are relatively far away from each other, the first facing section and the second facing section closely face each other to block the light propagation path.

(8)

The light-emitting device according to (6) or (7), in which reflectivity of one or both of the first facing section and the second facing section is lower than reflectivity of an inner surface of the boundary aperture.

(9)

The light-emitting device according to (8), in which a light absorbing film is provided on one or both of the first facing section and the second facing section.

(10)

The light-emitting device according to any one of (1) to (9), further including one main body, the main body holding the first reflection member and the second reflection member.

(11)

The light-emitting device according to (10), in which the light source substrate includes a first light source substrate including the plurality of first light sources and a second light source substrate including the plurality of second light sources, and the main body further holds the first light source substrate and the second light source substrate.

(12)

The light-emitting device according to any one of (1) to (9), further including:

one main body; and a first connection member coupling the first reflection member and the main body together and a second connection member coupling the second reflection member and the main body together.

(13)

The light-emitting device according to (12), in which the light source substrate includes a first light source substrate including the plurality of first light sources and a second light source substrate including the plurality of second light sources, and the first light source substrate is held by the first connection member, and the second light source substrate is held by the second connection member.

(14)

A display apparatus, including:

a display panel; and a light-emitting device that illuminates the display panel, the light-emitting device including a light source substrate including a plurality of light sources, a first reflection member including a plurality of first apertures and a first overlap portion and located to overlap a portion of the light source substrate, each of the plurality of first apertures provided at a position corresponding to a relevant one of a plurality of first light sources of the plurality of light sources, and the first overlap portion provided along an outer edge of the first reflection member, and a second reflection member including a plurality of second apertures and a second overlap portion and located to overlap another portion of the light source substrate, each of the plurality of second apertures provided at a position corresponding to a relevant one of a plurality of second light sources of the plurality of light sources, and the second overlap portion provided along an outer edge of the second reflection member and overlapping the first overlap portion, in which the first reflection member and the second reflection member are provided at positions adjacent to each other in an in-plane direction, and are disposed to allow relative positions of the first reflection member and the second reflection member in the in-plane direction to be displaced within a range in which the first overlap portion and the second overlap portion overlap each other.

(15)

An lighting apparatus including a light-emitting device, the light-emitting device including a light source substrate including a plurality of light sources, a first reflection member including a plurality of first apertures and a first overlap portion and located to overlap a portion of the light source substrate, each of the plurality of first apertures provided at a position corresponding to a relevant one of a plurality of first light sources of the plurality of light sources, and the first overlap portion provided along an outer edge of the first reflection member, and a second reflection member including a plurality of second apertures and a second overlap portion and located to overlap another portion of the light source substrate, each of the plurality of second apertures provided at a position corresponding to a relevant one of a plurality of second light sources of the plurality of light sources, and the second overlap portion provided along an outer edge of the second reflection member and overlapping the first overlap portion, in which the first reflection member and the second reflection member are provided at positions adjacent to each other in an in-plane direction, and are disposed to allow relative positions of the first reflection member and the second reflection member in the in-plane direction to be displaced within a range in which the first overlap portion and the second overlap portion overlap each other.

The present application is based on and claims priority from Japanese Patent Application No. 2016-39129 filed in the Japan Patent Office on Mar. 1, 2016, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A light-emitting device, comprising:
a light source substrate including a plurality of light sources;
a first reflection member including a plurality of first apertures and a first overlap portion and located to overlap a portion of the light source substrate, each of the plurality of first apertures provided at a position corresponding to a relevant one of a plurality of first light sources of the plurality of light sources, and the first overlap portion provided along an outer edge of the first reflection member; and
a second reflection member including a plurality of second apertures and a second overlap portion and located to overlap another portion of the light source substrate, each of the plurality of second apertures provided at a position corresponding to a relevant one of a plurality of second light sources of the plurality of light sources, and the second overlap portion provided along an outer edge of the second reflection member and overlapping the first overlap portion,
wherein the first reflection member and the second reflection member are provided at positions adjacent to each other in an in-plane direction, and are disposed to allow relative positions of the first reflection member and the second reflection member in the in-plane direction to be displaced within a range in which the first overlap portion and the second overlap portion overlap each other.

2. The light-emitting device according to claim 1, wherein
the first overlap portion includes a boundary aperture and a first facing surface, the boundary aperture being some of the plurality of first apertures, and the first facing surface facing the second overlap portion,
in a close state in which the first reflection member and the second reflection member are relatively close to each other, the first facing surface is exposed from the boundary aperture, and
reflectivity of the first facing surface is lower than reflectivity of an inner surface of the boundary aperture.

3. The light-emitting device according to claim 2, wherein a light absorbing film is provided on the first facing surface.

4. The light-emitting device according to claim 1, wherein
the first overlap portion includes a boundary aperture being some of the plurality of first apertures,
the second overlap portion includes a second facing surface facing the first overlap portion,
in a close state in which the first reflection member and the second reflection member are relatively close to each other, the second facing surface is exposed from the boundary aperture, and
reflectivity of the second facing surface is lower than reflectivity of an inner surface of the boundary aperture.

5. The light-emitting device according to claim 4, wherein a light absorbing film is provided on the second facing surface.

6. The light-emitting device according to claim 1, wherein
the first overlap portion including a boundary aperture and a first facing section, the boundary aperture being some of the plurality of first apertures, and the first facing section facing the second overlap portion,
the second overlap portion includes a second facing section facing the first facing section, and
in a close state in which the first reflection member and the second reflection member are relatively close to each other, the first facing section and the second facing section move far away from each other to form a light propagation path from an inner surface of the boundary aperture to the light source substrate.

7. The light-emitting device according to claim 6, wherein in a second state in which the first reflection member and the second reflection member are relatively far away from each other, the first facing section and the second facing section closely face each other to block the light propagation path.

8. The light-emitting device according to claim 6, wherein reflectivity of one or both of the first facing section and the second facing section is lower than reflectivity of the inner surface of the boundary aperture.

9. The light-emitting device according to claim 8, wherein a light absorbing film is provided on one or both of the first facing section and the second facing section.

10. The light-emitting device according to claim 1, further comprising a main body,
the main body holding the first reflection member and the second reflection member.

11. The light-emitting device according to claim 10, wherein
the light source substrate includes a first light source substrate including the plurality of first light sources and a second light source substrate including the plurality of second light sources, and
the main body further holds the first light source substrate and the second light source substrate.

12. The light-emitting device according to claim 1, further comprising:
a main body; and
a first connection member connecting the first reflection member and the main body together and a second connection member coupling the second reflection member and the main body together.

13. The light-emitting device according to claim 12, wherein
the light source substrate includes a first light source substrate including the plurality of first light sources and a second light source substrate including the plurality of second light sources, and
the first light source substrate is held by the first connection member, and the second light source substrate is held by the second connection member.

14. A display apparatus, comprising:
a display panel; and
a light-emitting device that illuminates the display panel, the light-emitting device including
a light source substrate including a plurality of light sources,
a first reflection member including a plurality of first apertures and a first overlap portion and located to overlap a portion of the light source substrate, each of the plurality of first apertures provided at a position corresponding to a relevant one of a plurality of first light sources of the plurality of light sources, and the first overlap portion provided along an outer edge of the first reflection member, and
a second reflection member including a plurality of second apertures and a second overlap portion and located to overlap another portion of the light source substrate, each of the plurality of second apertures provided at a position corresponding to a relevant one of a plurality of second light sources of the plurality of light sources, and the second overlap portion provided along an outer edge of the second reflection member and overlapping the first overlap portion,
wherein the first reflection member and the second reflection member are provided at positions adjacent to each other in an in-plane direction, and are disposed to allow relative positions of the first reflection member and the second reflection member in the in-plane direction to be displaced within a range in which the first overlap portion and the second overlap portion overlap each other.

15. An lighting apparatus comprising a light-emitting device, the light-emitting device including:
- a light source substrate including a plurality of light sources;
- a first reflection member including a plurality of first apertures and a first overlap portion and located to overlap a portion of the light source substrate,
  - each of the plurality of first apertures provided at a position corresponding to a relevant one of a plurality of first light sources of the plurality of light sources, and
  - the first overlap portion provided along an outer edge of the first reflection member; and
- a second reflection member including a plurality of second apertures and a second overlap portion and located to overlap another portion of the light source substrate,
  - each of the plurality of second apertures provided at a position corresponding to a relevant one of a plurality of second light sources of the plurality of light sources, and
  - the second overlap portion provided along an outer edge of the second reflection member and overlapping the first overlap portion, wherein the first reflection member and the second reflection member are provided at positions adjacent to each other in an in-plane direction, and are disposed to allow relative positions of the first reflection member and the second reflection member in the in-plane direction to be displaced within a range in which the first overlap portion and the second overlap portion.

\* \* \* \* \*